United States Patent
Gerst, III et al.

(10) Patent No.: US 8,282,000 B2
(45) Date of Patent: *Oct. 9, 2012

(54) METHOD AND APPARATUS FOR PROVIDING OMNIDIRECTIONAL LIGHTING IN A SCANNING DEVICE

(75) Inventors: Carl W. Gerst, III, Natick, MA (US); William H Equitz, Waban, MA (US); Justin Testa, Wellesley, MA (US); Sateesh Nadahar, Framingham, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/294,285

(22) Filed: Nov. 11, 2011

(65) Prior Publication Data
US 2012/0118966 A1    May 17, 2012

Related U.S. Application Data

(63) Continuation of application No. 12/552,107, filed on Sep. 1, 2009, now Pat. No. 8,061,613, which is a continuation of application No. 10/911,989, filed on Aug. 5, 2004, now Pat. No. 7,604,174, which is a continuation-in-part of application No. 10/693,626, filed on Oct. 24, 2003, now Pat. No. 7,823,783.

(51) Int. Cl.
*G06K 7/00* (2006.01)
(52) U.S. Cl. ............... 235/455; 235/642.42; 235/462.01; 235/462.45
(58) Field of Classification Search .................. 235/455, 235/642.42, 462.01, 462.45
See application file for complete search history.

(56) References Cited

U.S. PATENT DOCUMENTS

| | | | |
|---|---|---|---|
| 2,357,378 | A | 9/1944 | Benford |
| 3,726,998 | A | 4/1973 | Szpak et al. |
| 3,857,626 | A | 12/1974 | Rosenberger et al. |
| 3,961,198 | A | 6/1976 | Angst et al. |
| 4,240,748 | A | 12/1980 | Blanc et al. |
| 4,282,425 | A | 8/1981 | Chadima et al. |
| 4,570,057 | A | 2/1986 | Chadima, Jr. et al. |
| 4,743,773 | A | 5/1988 | Katana et al. |
| 4,766,300 | A | 8/1988 | Chadima, Jr. et al. |

(Continued)

FOREIGN PATENT DOCUMENTS

CN    1426570    6/2003
(Continued)

OTHER PUBLICATIONS

Cognex Corporation, AcuReader/OCR, Accurate, Fast Wafer Identification, 1995-1996.

(Continued)

*Primary Examiner* — Allyson Trail

(57) ABSTRACT

Systems and methods are provided for selectively controlling the illumination, and particularly dark field illumination, applied to a symbol to be decoded, and for determining a suitable or optimized level of lighting for decoding the symbol. A method includes providing a light source comprising a plurality of individually-controllable lighting elements for providing low angle dark field illumination; activating an image sensor for detecting image data reflected from an encoded data symbol when the encoded data symbol is illuminated by the light source; and providing a controller connected to each of the individually-controllable lighting elements, the controller being programmed for: selectively activating the individually-controllable lighting elements to vary the direction of the low angle dark field illumination provided by the light source; and processing the image data detected by the image.

30 Claims, 15 Drawing Sheets

U.S. PATENT DOCUMENTS

| | | |
|---|---|---|
| 4,820,911 A | 4/1989 | Arackellian et al. |
| 4,894,523 A | 1/1990 | Chadima et al. |
| 4,969,037 A | 11/1990 | Poleschinski et al. |
| 5,019,699 A | 5/1991 | Koenck |
| 5,149,948 A | 9/1992 | Chisholm |
| 5,177,346 A | 1/1993 | Chisholm |
| 5,202,817 A | 4/1993 | Koenck |
| 5,227,614 A | 7/1993 | Danielson et al. |
| 5,239,169 A | 8/1993 | Thomas |
| 5,258,606 A | 11/1993 | Chadima, Jr. et al. |
| 5,291,009 A | 3/1994 | Rotaei |
| 5,313,373 A | 5/1994 | Bjorner et al. |
| 5,319,182 A | 6/1994 | Havens et al. |
| 5,331,176 A | 7/1994 | San't Anselmo et al. |
| 5,349,172 A | 9/1994 | Rotaei |
| 5,354,977 A | 10/1994 | Rotaie |
| 5,359,185 A | 10/1994 | Hanson |
| 5,367,439 A | 11/1994 | Mayer et al. |
| 5,374,817 A | 12/1994 | Bard et al. |
| 5,378,883 A | 1/1995 | Batterman et al. |
| 5,406,060 A | 4/1995 | Gitin |
| 5,408,084 A | 4/1995 | Brandorff et al. |
| 5,414,251 A | 5/1995 | Durbin |
| 5,422,472 A | 6/1995 | Tavislan et al. |
| 5,430,285 A | 7/1995 | Karpen et al. |
| 5,442,247 A | 8/1995 | Suzuki et al. |
| 5,449,892 A | 9/1995 | Yamada |
| 5,461,417 A | 10/1995 | White et al. |
| 5,463,214 A | 10/1995 | Longacre, Jr. et al. |
| 5,469,294 A | 11/1995 | Wilt et al. |
| 5,481,098 A | 1/1996 | Davis et al. |
| 5,484,994 A | 1/1996 | Rotaei |
| 5,500,516 A | 3/1996 | Durbin |
| 5,504,317 A | 4/1996 | Takahashi |
| 5,504,367 A | 4/1996 | Arackellian et al. |
| 5,514,858 A | 5/1996 | Ackley |
| 5,515,452 A | 5/1996 | Penkethman et al. |
| 5,532,467 A | 7/1996 | Rotaei et al. |
| 5,569,902 A | 10/1996 | Wood et al. |
| 5,576,527 A | 11/1996 | Sawanobori |
| 5,585,616 A | 12/1996 | Roxby et al. |
| 5,586,212 A | 12/1996 | McConica et al. |
| 5,591,955 A | 1/1997 | Laser |
| 5,598,007 A | 1/1997 | Bunce et al. |
| 5,606,160 A | 2/1997 | Tani et al. |
| 5,619,029 A | 4/1997 | Roxby et al. |
| 5,623,137 A | 4/1997 | Powers et al. |
| 5,654,533 A | 8/1997 | Suzuki et al. |
| 5,654,540 A | 8/1997 | Stanton et al. |
| 5,659,167 A | 8/1997 | Wang et al. |
| 5,684,290 A | 11/1997 | Arackellian et al. |
| 5,690,417 A | 11/1997 | Polidor et al. |
| 5,697,699 A | 12/1997 | Seo et al. |
| 5,703,348 A | 12/1997 | Suzuki et al. |
| 5,715,095 A | 2/1998 | Hiratsuka et al. |
| 5,723,868 A | 3/1998 | Hammond, Jr. et al. |
| 5,734,153 A | 3/1998 | Swartz et al. |
| 5,743,633 A | 4/1998 | Chau et al. |
| 5,750,974 A | 5/1998 | Sasaki et al. |
| 5,756,981 A | 5/1998 | Rotaei et al. |
| 5,773,810 A | 6/1998 | Hussey et al. |
| 5,777,314 A | 7/1998 | Rotaei |
| 5,780,834 A | 7/1998 | Havens et al. |
| 5,783,811 A | 7/1998 | Feng et al. |
| 5,786,586 A | 7/1998 | Pidhimy et al. |
| 5,793,033 A | 8/1998 | Feng et al. |
| 5,811,784 A | 9/1998 | Tach et al. |
| 5,834,754 A | 11/1998 | Feng et al. |
| 5,859,418 A | 1/1999 | Li et al. |
| 5,861,910 A | 1/1999 | McGarry et al. |
| 5,886,338 A | 3/1999 | Arackellian et al. |
| 5,894,348 A | 4/1999 | Bacchi et al. |
| 5,903,391 A | 5/1999 | Toshima et al. |
| 5,907,148 A | 5/1999 | Iwafuchi et al. |
| 5,919,057 A | 7/1999 | Kameyama |
| 5,920,643 A | 7/1999 | White et al. |
| 5,923,020 A | 7/1999 | Kurokawa et al. |
| 5,949,057 A | 9/1999 | Feng |
| 5,949,763 A | 9/1999 | Lund |
| 5,969,321 A | 10/1999 | Danielson et al. |
| 5,979,763 A | 11/1999 | Wang |
| 5,984,494 A | 11/1999 | Chapman et al. |
| 5,992,751 A | 11/1999 | Laser |
| 6,011,586 A | 1/2000 | Lepoir et al. |
| 6,022,124 A | 2/2000 | Bourn et al. |
| 6,033,090 A | 3/2000 | Seo |
| 6,034,379 A | 3/2000 | Bunte et al. |
| 6,036,095 A | 3/2000 | Seo |
| 6,039,254 A | 3/2000 | FroesePeeck et al. |
| 6,039,255 A | 3/2000 | Seo |
| 6,042,012 A | 3/2000 | Olmstead et al. |
| 6,045,047 A | 4/2000 | Pidhimy et al. |
| 6,060,722 A | 5/2000 | Havens et al. |
| 6,065,678 A | 5/2000 | Li et al. |
| 6,073,852 A | 6/2000 | Seo |
| 6,105,869 A | 8/2000 | Scharf et al. |
| 6,119,939 A | 9/2000 | Schwartz et al. |
| 6,141,046 A | 10/2000 | Roth et al. |
| 6,158,661 A | 12/2000 | Chadima, Jr. et al. |
| 6,164,544 A | 12/2000 | Schwartz et al. |
| 6,210,013 B1 | 4/2001 | Boufield |
| 6,223,986 B1 | 5/2001 | Bobba et al. |
| 6,234,397 B1 | 5/2001 | He et al. |
| 6,247,645 B1 | 6/2001 | Harris et al. |
| 6,249,008 B1 | 6/2001 | Bunte et al. |
| 6,250,551 B1 | 6/2001 | He et al. |
| 6,260,763 B1 | 7/2001 | Svetal |
| 6,267,294 B1 | 7/2001 | Stern et al. |
| 6,283,374 B1 | 9/2001 | Fantone et al. |
| 6,330,974 B1 | 12/2001 | Ackley |
| 6,340,114 B1 | 1/2002 | Correa et al. |
| 6,341,878 B1 | 1/2002 | Chiang |
| 6,347,163 B2 | 2/2002 | Rotaei et al. |
| 6,347,874 B1 | 2/2002 | Boyd et al. |
| 6,352,204 B2 | 3/2002 | Hattersley et al. |
| 6,360,948 B1 | 3/2002 | Yang et al. |
| 6,371,374 B1 | 4/2002 | Schwartz et al. |
| 6,385,352 B1 | 5/2002 | Rotaei |
| 6,385,507 B1 | 5/2002 | Buijtels et al. |
| 6,394,349 B1 | 5/2002 | Shigeka et al. |
| 6,405,925 B2 | 6/2002 | He et al. |
| 6,429,934 B1 | 8/2002 | Dunn et al. |
| 6,435,411 B1 | 8/2002 | Massieu et al. |
| 6,491,223 B1 | 12/2002 | Longacre, Jr. et al. |
| 6,505,778 B1 | 1/2003 | Reddersen et al. |
| 6,513,714 B1 | 2/2003 | Davis et al. |
| 6,547,146 B1 | 4/2003 | Meksavan et al. |
| 6,575,367 B1 | 6/2003 | Longacre, Jr. |
| 6,581,838 B1 | 6/2003 | Meksavan et al. |
| 6,592,040 B2 | 7/2003 | Barkan |
| 6,595,422 B1 | 7/2003 | Doljack |
| 6,598,797 B2 | 7/2003 | Lee |
| 6,601,768 B2 | 8/2003 | McCall et al. |
| 6,607,128 B1 | 8/2003 | Schwartz et al. |
| 6,607,132 B1 | 8/2003 | Dvorkis et al. |
| 6,621,065 B1 | 9/2003 | Fukumoto et al. |
| 6,659,350 B2 | 12/2003 | Schwartz et al. |
| 6,661,521 B1 | 12/2003 | Stern et al. |
| 6,681,037 B1 | 1/2004 | Koljonen |
| 6,689,998 B1 | 2/2004 | Bremer |
| 6,729,546 B2 | 5/2004 | Rotaei |
| 6,760,165 B2 | 7/2004 | Wulff et al. |
| 6,803,088 B2 | 10/2004 | Kaminsky et al. |
| 6,809,847 B2 | 10/2004 | McQueen |
| 6,831,290 B2 | 12/2004 | Mentzer |
| 6,832,725 B2 | 12/2004 | Gardiner et al. |
| 6,854,650 B2 | 2/2005 | Hattersley et al. |
| 6,860,428 B1 | 3/2005 | Dowling et al. |
| 6,914,679 B2 | 7/2005 | Nettekoven et al. |
| 7,021,542 B2 | 4/2006 | Patel et al. |
| 7,025,271 B2 | 4/2006 | Dvorkis et al. |
| 7,025,272 B2 | 4/2006 | Yavid et al. |
| 7,025,273 B2 | 4/2006 | Breytman et al. |
| 7,038,853 B2 | 5/2006 | Li et al. |
| 7,044,377 B2 | 5/2006 | Patel et al. |
| 7,090,132 B2 | 8/2006 | Havens et al. |
| 7,128,266 B2 | 10/2006 | Zhu et al. |

| | | | |
|---|---|---|---|
| 7,131,587 B2 | 11/2006 | He et al. |
| 7,159,764 B1 | 1/2007 | White et al. |
| 7,163,149 B2 | 1/2007 | He et al. |
| 7,180,052 B1 | 2/2007 | Barkan et al. |
| 7,187,825 B2 | 3/2007 | Lim et al. |
| 7,204,418 B2 | 4/2007 | Josep et al. |
| 7,204,420 B2 | 4/2007 | Barken et al. |
| 7,224,540 B2 | 5/2007 | Olmstead et al. |
| 7,225,989 B2 | 6/2007 | Zhu et al. |
| 7,240,844 B2 | 7/2007 | Zhu et al. |
| 7,253,384 B2 | 8/2007 | Barnes et al. |
| 7,267,282 B2 | 9/2007 | Zhu et al. |
| 7,270,274 B2 | 9/2007 | Hennick et al. |
| 7,278,575 B2 | 10/2007 | Zhu et al. |
| 7,281,661 B2 | 10/2007 | Zhu et al. |
| 7,296,749 B2 | 11/2007 | Massieu |
| 7,306,155 B2 | 12/2007 | Hennick et al. |
| 7,314,173 B2 | 1/2008 | Philyaw et al. |
| 7,331,524 B2 | 2/2008 | Vinogradov et al. |
| 7,360,705 B2 | 4/2008 | Heinrich |
| 7,451,917 B2 | 11/2008 | McCall et al. |
| 7,490,774 B2 | 2/2009 | Zhu et al. |
| 7,520,434 B2 | 4/2009 | Jolivet et al. |
| 7,568,628 B2 | 8/2009 | Wang et al. |
| 7,604,174 B2 | 10/2009 | Gerst et al. |
| 7,823,783 B2 | 11/2010 | Gerst et al. |
| 2001/0027999 A1 | 10/2001 | Lee |
| 2002/0000472 A1 | 1/2002 | Hattersley et al. |
| 2002/0030094 A1 | 3/2002 | Curry et al. |
| 2002/0074403 A1 | 6/2002 | Krichever et al. |
| 2002/0096566 A1 | 7/2002 | Schwartz et al. |
| 2002/0104887 A1 | 8/2002 | Schlieffers et al. |
| 2002/0125322 A1 | 9/2002 | McCall et al. |
| 2002/0170970 A1 | 11/2002 | Ehrhart |
| 2003/0001018 A1 | 1/2003 | Hussey et al. |
| 2003/0029917 A1 | 2/2003 | Hennick et al. |
| 2003/0034394 A1 | 2/2003 | Gannon et al. |
| 2003/0058631 A1 | 3/2003 | Yoneda |
| 2003/0062413 A1 | 4/2003 | Gardiner et al. |
| 2003/0062418 A1 | 4/2003 | Barber et al. |
| 2003/0080187 A1 | 5/2003 | Piva et al. |
| 2003/0080189 A1 | 5/2003 | Patel et al. |
| 2003/0163623 A1 | 8/2003 | Yeung |
| 2004/0069855 A1 | 4/2004 | Patel et al. |
| 2004/0156539 A1 | 8/2004 | Jansson et al. |
| 2004/0217173 A1 | 11/2004 | Lizotte et al. |
| 2004/0238637 A1 | 12/2004 | Rsell et al. |
| 2005/0029439 A1 | 2/2005 | Benedict |
| 2005/0047723 A1 | 3/2005 | Li |
| 2005/0117144 A1 | 6/2005 | Greenway et al. |
| 2005/0180037 A1 | 8/2005 | Masterson |
| 2005/0199725 A1 | 9/2005 | Caraen et al. |
| 2006/0027657 A1 | 2/2006 | Ninnink et al. |
| 2006/0027659 A1 | 2/2006 | Patel et al. |
| 2006/0032921 A1 | 2/2006 | Gerst et al. |
| 2006/0060653 A1 | 3/2006 | Wittenberg et al. |
| 2006/0131419 A1 | 6/2006 | Nunnink |
| 2006/0133757 A1 | 6/2006 | Nunnink |
| 2007/0206183 A1 | 9/2007 | Lebens |

FOREIGN PATENT DOCUMENTS

| | | |
|---|---|---|
| DE | 3737792 | 5/1989 |
| DE | 3931044 | 3/1991 |
| DE | 4003983 | 8/1991 |
| DE | 4123916 | 1/1992 |
| DE | 10026301 | 11/2001 |
| DE | 10113426 | 9/2002 |
| EP | 0185 782 | 3/1989 |
| EP | 0356680 | 3/1990 |
| EP | 1158460 | 11/2001 |
| JP | S53-62387 | 6/1978 |
| JP | H3-53784 | 3/1991 |
| JP | 04-223583 | 8/1992 |
| JP | 06124361 | 5/1994 |
| JP | 08129597 | 5/1996 |
| JP | 08287176 | 11/1996 |
| JP | 10134133 | 5/1998 |
| JP | 2000-231600 | 8/2000 |
| JP | 2001-307011 | 11/2001 |
| JP | 200728088 | 1/2007 |
| WO | WO 9112489 | 8/1991 |
| WO | WO-9216909 | 10/1992 |
| WO | WO 9949347 | 9/1999 |
| WO | WO 0016073 | 3/2000 |
| WO | WO 0163258 | 8/2001 |
| WO | WO-0165469 | 9/2001 |
| WO | WO 02075637 | 9/2002 |
| WO | WO 2004006438 | 1/2004 |

OTHER PUBLICATIONS

Cognex Corporation, DataMan 6500 Series, Quick Reference Guide, Aug. 10, 2004.

Vision-Supplies.com, Siemens LytePipe 1.5" × 30, 1999.

PCT Search Report, PCT/US2004/034389, pp. 1-18, dated May 2, 2005.

PCT Search Report, PCT/US2004/034872, pp. 1-19, dated Feb. 24, 2005.

Japanese Patent Office Action, Application No. 2006-536784, 1-9, Oct. 6, 2009.

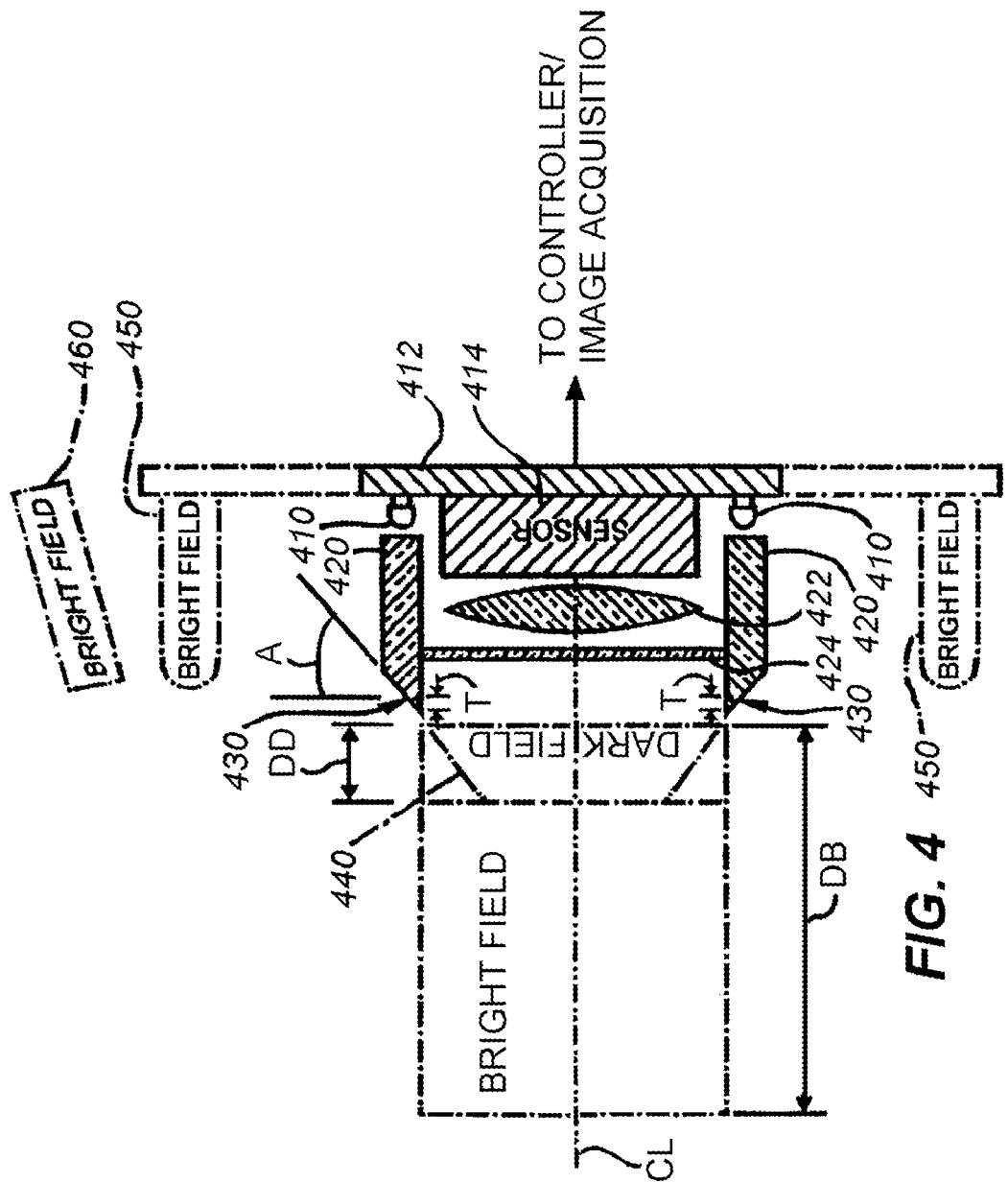

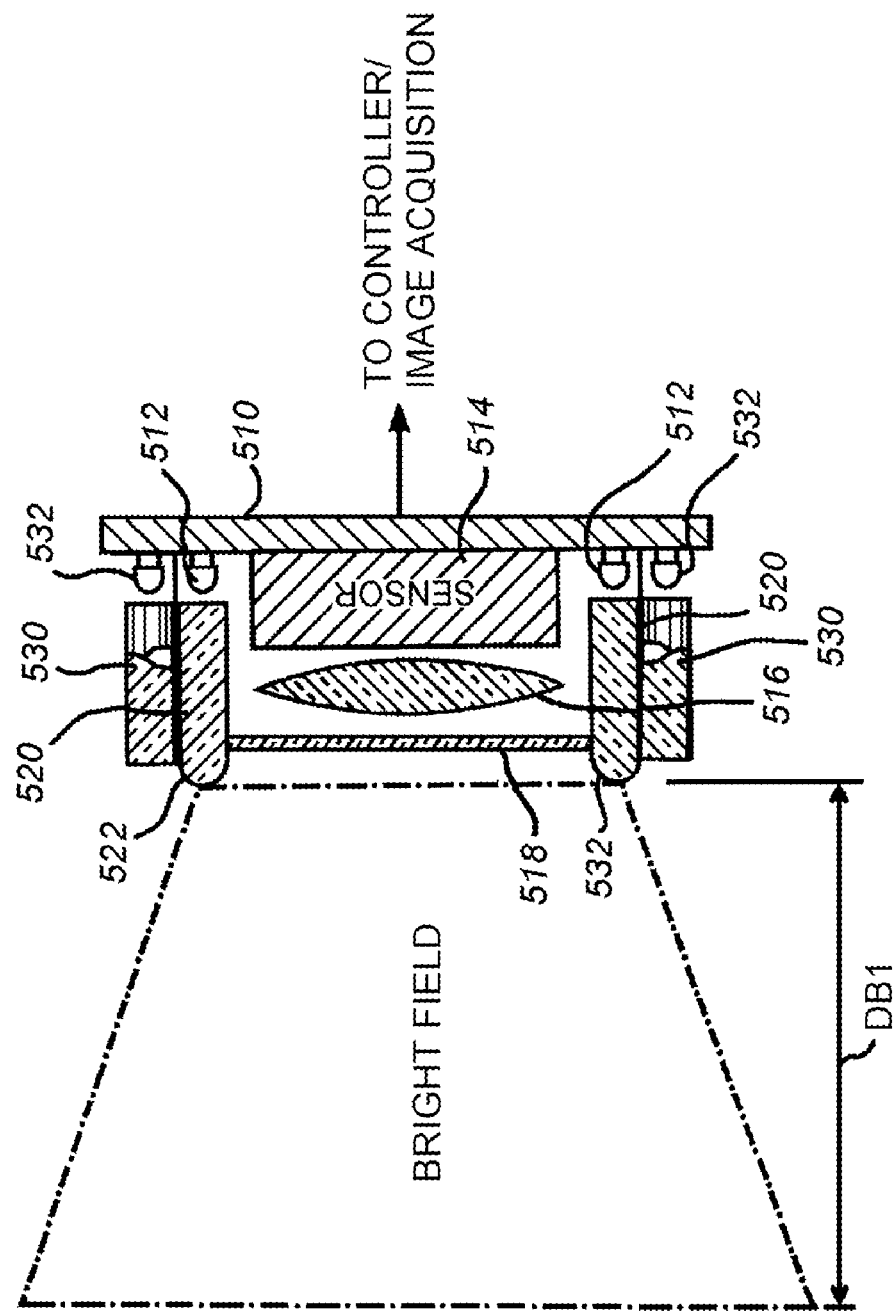

METHOD AND APPARATUS FOR PROVIDING OMNIDIRECTIONAL LIGHTING IN A SCANNING DEVICE

CROSS REFERENCE TO RELATED APPLICATION

This application is a continuation of U.S. patent application Ser. No. 12/552,107, filed on Sep. 1, 2009, now U.S. Pat. No. 8,061,613, and entitled "Method And Apparatus For Providing Omnidirectional Lighting In A Scanning Device," which is a continuation of U.S. patent application Ser. No. 10/911,989, filed on Aug. 5, 2004, now U.S. Pat. No. 7,604,174, and entitled "Method And Apparatus For Providing Omnidirectional Lighting In A Scanning Device," which is a continuation-in-part of U.S. patent application Ser. No. 10/693,626 filed Oct. 24, 2003 now U.S. Pat. No. 7,826,783 entitled "Light Pipe Illumination System and Method," each of which are hereby incorporated by reference.

FIELD OF THE INVENTION

This invention relates to illuminators and more particularly to illuminators for image acquisition devices and machine vision systems.

BACKGROUND OF THE INVENTION

Machine vision systems use image acquisition devices that include camera sensors to deliver information on a viewed subject. The system then interprets this information according to a variety of algorithms to perform a programmed decision-making and/or identification function. For an image to be most-effectively acquired by a sensor in the visible, and near-visible light range, the subject should be properly illuminated.

In the example of barcode scanning using an image sensor, good lighting is highly desirable. Barcode scanning entails the aiming of an image acquisition sensor (CMOS camera, CCD, etc.) at a location on an object that contains a bar code, and retrieval of an image of that barcode. The bar code contains a set of predetermined patterns that represent an ordered group of characters or symbols from which an attached data processor (for example a microcomputer) can derive useful information about the object (e.g. its serial number, type, model, price, etc.). Barcodes are available in a variety of shapes and sizes. Two of the most commonly employed barcode types are the so-called one-dimensional barcode, consisting a line of vertical stripes of varying width and spacing, and the so-called two-dimensional barcode consisting of a two-dimensional array of dots or rectangles.

In reading barcodes or other subjects of interest the type of illumination employed is of concern. Where barcodes and other viewed subjects are printed on a flat surface with contrasting ink or paint, a diffuse, high-angle "bright field" illumination may best highlight these features for the sensor. By high-angle it is meant, generally, light that strikes the subject nearly perpendicularly (normal) or at an angle that is typically no more than about 45 degrees from perpendicular (normal) to the surface of the item being scanned. Such illumination is subject to substantial reflection back toward the sensor. By way of example, barcodes and other subjects requiring mainly bright field illumination may be present on a printed label adhered to an item or container, or on a printed field in a relatively smooth area of item or container.

Conversely, where a barcode or other subject is formed on a more-irregular surface or is created by etching or peening a pattern directly on the surface, the use of highly reflective bright field illumination may be inappropriate. A peened/etched surface has two-dimensional properties that tend to scatter bright field illumination, thereby obscuring the acquired image. Where a viewed subject has such decidedly two-dimensional surface texture, it may be best illuminated with dark field illumination. This is an illumination with a characteristic low angle (approximately 45 degrees or less, for example) with respect to the surface of the subject (i.e. an angle of more than approximately 45 degrees with respect to normal). Using such low-angle, dark field illumination, two-dimensional surface texture is contrasted more effectively (with indents appearing as bright spots and the surroundings as shadow) for better image acquisition.

To take full advantage of the versatility of a camera image sensor, it is desirable to provide both bright field and dark field illumination for selective or simultaneous illumination of a subject. However, dark field illumination must be presented close to a subject to attain the low incidence angle thereto. Conversely, bright field illumination is better produced at a relative distance to ensure full area illumination.

In addition, a current-production sensor may have a resolution of 640×480 (over 300 K) or 1280×1024 (over 1.3 M) pixels within its native field of view. This resolution is desirable for attaining an accurate image of the subject. However, processing speed may be compromised by the need to acquire every pixel in the field of view even if the subject is a relatively small part of that field (for example, the narrow strip of a one-dimensional barcode). If the field of view is to be narrowed to only encompass an area of interest, then a system for aiming the camera onto that area of interest is desirable. Likewise, where a given field of view may contain multiple codes or subjects, the ability to focus upon particular parts of that field of view to discern the selected subject is also desirable.

SUMMARY OF THE INVENTION

In one aspect, the present invention provides a method for decoding an encoded data symbol. The method comprises steps including providing a light source comprising a plurality of individually-controllable lighting elements for providing low angle dark field illumination; activating an image sensor for detecting image data reflected from an encoded data symbol when the encoded data symbol is illuminated by the light source; and providing a controller connected to each of the individually-controllable lighting elements, the controller being programmed for: selectively activating the individually-controllable lighting elements to vary the direction of the low angle dark field illumination provided by the light source; and processing the image data detected by the image.

In another aspect of the invention, a method for decoding an encoded data symbol is provided comprising steps including (a) providing a plurality of individually-controllable lighting elements arranged around the encoded data symbol to provide low-angle dark field illumination; (b) providing a bright field illuminator directed at the encoded data symbol to provide bright field illumination; (c) selectively illuminating the encoded data symbol with at least one of the individually-controllable lighting elements; (d) acquiring an image data set; (e) evaluating the image data set for determining suitability for decoding; (f) selectively varying a lighting parameter for varying the light emitted from the individually-controllable lighting elements to vary the direction of the low-angle dark field illumination on the encoded data symbol and selectively activating the bright field illuminator; and (g) repeating steps (e) and (f) until the image data set is suitable for decoding.

In yet another aspect, the present invention provides a method comprising the steps of using a ring light source, projecting low angle dark field illumination to an adjacent surface including a symbol to be decoded; providing a controller connected to the ring light source and using the controller for selectively varying the direction of the low angle dark field illumination provided from the ring light source; using an image sensor connected to the controller, the image sensor acquiring image data of the symbol, wherein the controller is programmed for: evaluating the acquired image data and determining whether the image data is sufficient to decode the symbol; and varying the light projected from the ring light source until the image data is sufficient to decode the symbol.

BRIEF DESCRIPTION OF THE DRAWINGS

The invention description below refers to the accompanying drawings, of which:

FIG. 4 is a side cross section of a sensor with dark field illuminating passive light pipe according to an embodiment of this invention;

FIG. 5 is a side cross section of a sensor with bright field illuminating passive light pipe and aiming illuminators according to an embodiment of this invention;

DETAILED DESCRIPTION OF AN ILLUSTRATIVE EMBODIMENT

Figure 1:
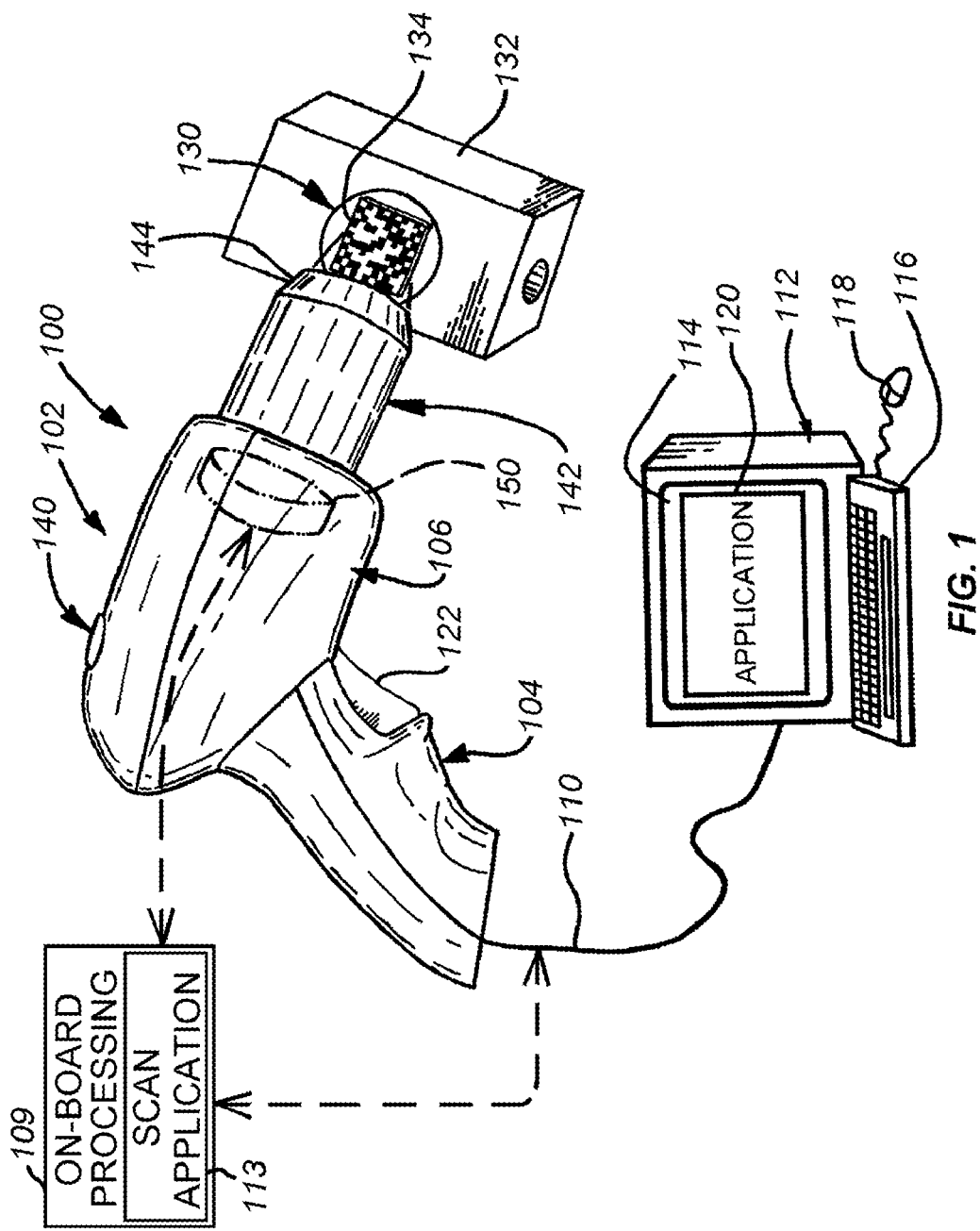
FIG. 1 is a perspective view of a handheld scanning system and subject employing a passive light pipe illuminator according to an embodiment of this invention.

FIG. 1 shows a scanning system 100 adapted for handheld operation. An exemplary handheld scanning appliance or handpiece 102 is provided. It includes a grip section 104 and a body section 106. The sensor and other functional components described herein can be controlled and can direct image data to an onboard embedded processor 109. This processor can include a scanning software application 113 by which lighting is controlled, images are acquired and image data is interpreted into usable information (for example, alphanumeric strings derived from the barcode images). The decoded information can be directed via a cable 110 to a PC or other data storage device 112 having (for example) a display 114, keyboard 116 and mouse 118, where it can be stored and further manipulated using an appropriate application 120. Alternatively, the cable 110 can be directly connected to an interface in the scanning appliance and an appropriate interface in the computer 112. In this case the computer-based application 120 performs various image interpretation and lighting control functions as needed. The precise arrangement of the handheld scanning appliance with respect to an embedded processor, computer or other processor is highly variable. For example, a wireless interconnect can be provided in which no cable 110 is present. Likewise, the depicted microcomputer can be substituted with another processing device, including an onboard processor or a miniaturized processing unit such as a personal digital assistant or other small-scale computing device.

The scanning application 113 can be adapted to respond to inputs from the scanning appliance 102. For example, when the operator toggles a trigger 122 on the appliance 102, an internal camera image sensor (150, shown and described further below) acquires an image of a region of interest 130 on an item 132. The exemplary region of interest includes a two-dimensional bar code 134 that can be used to identify the part 132. Identification and other processing functions are carried out by the scanning application 113, based upon image data transmitted from the appliance 102 to the processor 109.

Simultaneously with, or in advance of acquisition of the image, the area of interest 130 is illuminated. In one embodiment, a switch 140 on the appliance 102 can be used to operate the illuminator, which consists of a novel light pipe arrangement 142 in accordance with this invention. Alternatively, as will be described below, the operation of the illuminator can be operated and controlled remotely by the scanning software application 120. The passive light pipe 142 consists of an extended barrel of light transmissive material terminating (in this embodiment) in an angled tip 144. As described further below, this tip is designed to cause internal reflection that projects a low-angle dark field illumination in the area of interest 130. As noted above, such dark field illumination is typically provided at an angle of no more than approximately 45 degrees with respect to the surface or more than 45 degrees normal to the optical axis. Extending through the center of the light pipe, which comprises a hollow tube, is a camera sensor 150 (shown in phantom and associated optics). The focal point of the camera is selected so that it is able to focus on the desired area of interest, as its field of view, in close proximity to the tip 144. In this manner, the tip can be placed very close to, or in contact with the area of interest for accurate viewing. As noted above, the bar code 134 in this embodiment is one that is best viewed using a dark field illumination. However, as will be described further below, the light pipes described in accordance with this invention also has the ability to provide bright field illumination for bar codes that are better suited to direct, high-angle illumination (for example, those printed with high contrast ink on a relatively smooth, matte surface).

Figure 2:
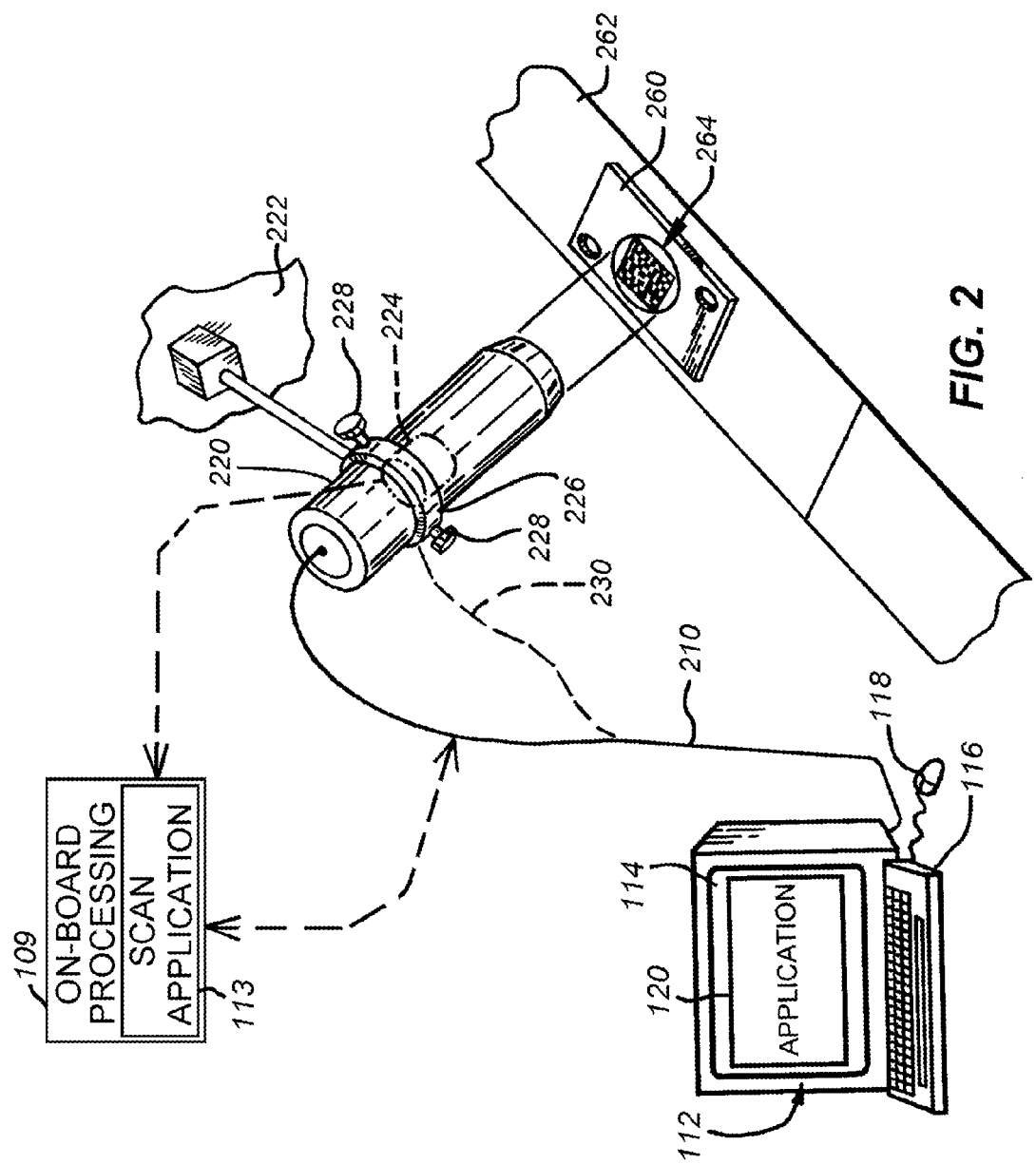
FIG. 2 is a perspective view of a fixedly mounted scanning system and subject employing a passive light pipe illuminator according to an embodiment of this invention.

FIG. 2 shows another implementation of the light pipe in accordance with an embodiment of this invention. An embedded processor 109 and/or computer 112 and associated applications 113 and/or 120 similar to those described above can be employed. An associated cable 210 interconnects the computer, via an interface, with a camera element 220. The camera element can be a conventional camera mounted on a fixed bracket 222. It includes a lens and electro-optical sensor assembly 224 (shown in phantom). The light pipe is removably mounted via a securing ring 226 with exemplary securing screws 228 in this embodiment. Note, while screws 228 are use, any fastener system can be substituted. A cable 230, shown in phantom, interconnects an internal ring illuminator, integral with light pipe, to either the processor 109 or the computer 112. This arrangement allows the light pipes of this invention to be secured as a retrofit to a variety of preexisting cameras. In any of the embodiments herein, the illuminator can be integrated with the camera's standard operating functions, such as its strobe and trigger mechanisms, or it can be controlled via the scanning application. Separate control circuitry (see FIGS. 14 and 15) can also be provided to modulate certain functions of the illuminator as described further below. In the example of FIG. 2, the illuminator is viewing parts or other items 260 moving along a conveyer 262. The area of interest 264 is a bar code that is best viewed using, for example, bright field illumination. As described below, the light pipe arrangement, in accordance with the various embodiments of this invention, can accommodate bright field illumination as well as dark field illumination. In both FIGS. 1 and 2, and other figures described herein, the image sensor is, typically, a commercially available CMOS or CCD image sensor with a resolution of, for example, 640×480 pixels or 1280×1024 pixels. Other resolutions and sensor types are expressly contemplated, however.

Figure 3:
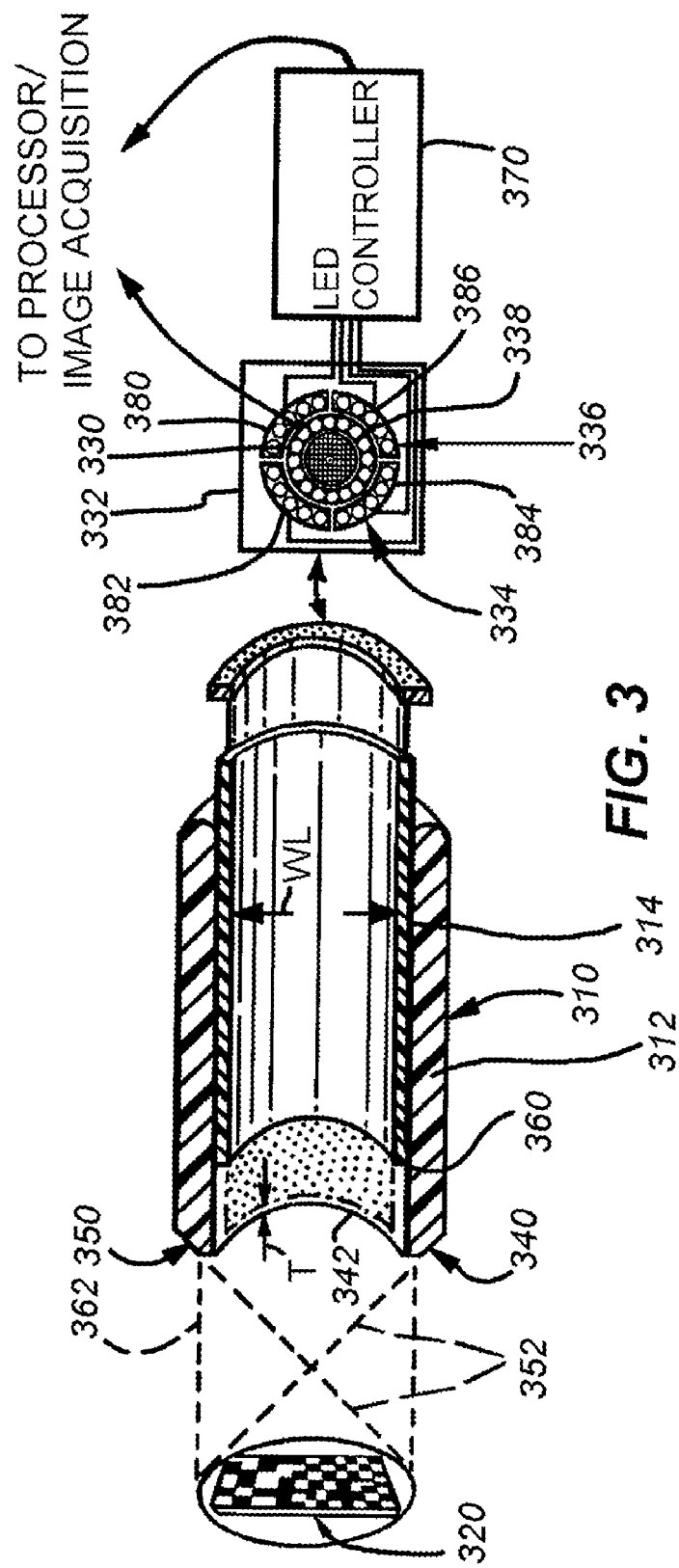
FIG. 3 is a schematic cross section of a passive light pipe and ring illuminator according to an embodiment of this invention.

With reference to FIG. 3, a version of the light pipe 310 described in FIGS. 1 and 2 is shown. This light pipe includes an outer tube 312 and a nested, inner tube 314. The innermost wall of the inner tube 314 defines, in this example, a circular lumen or channel. This channel is a path through which light can pass from the area of interest 320 to a board-mounted or separately placed sensor 330. The lumen has a diameter WL that is equal to or greater than the diameter of the optics of the camera sensor. In this embodiment, note that the sensor is mounted on a circuit board 332 that also includes the ring illuminator 334. This ring illuminator consists of an outer ring of LEDs or other appropriate light sources 336 and an inner ring 338 of LEDs or other appropriate light sources. The number of light sources, size of the rings and their shape are highly variable. Thus, the term "ring" should be taken broadly to describe a variety of regular and irregular curved (ovular, etc.) and/or polygonal (rectangular, square, etc.) perimeter shapes. For example, in some applications, a rectangular or oval illumination pipe can be used, providing a reader having a profile that is less tall than it is wide. In these types of configurations, and particularly in oval configurations, the dark field region extends to a distance from the end of the tube that is proportional to the width of the tube. When the pipe is twice as wide as it is tall, for example, the angle of illumination from the sides of the light pipe causes the light to meets at a distance further from the end of the pipe than the light from the top and bottom. Therefore the dark field illumination extends further from the pipe, providing an enhanced, larger field of dark field illumination. In addition to this advantage, the oval and rectangular shape can be advantageous as it reduces the overall size of the light pipe, and, further, can be stronger and more rugged in construction. Furthermore, the shape of the pipe can be selected based on the size and shape of the symbol to be decoded, as described with reference to FIG. 9, below.

In general, the ring illuminator's light sources are placed relatively close to the outer perimeter of the sensor and/or its optics and the number of sources is sufficient to fill in the illumination field and supply appropriate light to the subject. In general, any group of light sources or one or more continuous sources (e.g. tubes) arranged to light a perimeter of any size/shape can be broadly considered to be a "ring" light source herein.

Returning again to FIG. 3, in one embodiment, the ring can define a circle that is approximately 2-3 inches in outer diameter. Each ring is aligned with respect to one of the light pipes 312 and 314. As described below, appropriate baffles separate the rings from each other so that light from one ring does not leak into the other ring. Referring still to FIG. 3, the outer LED ring 336 can also be divided into individually-controllable segments. Here, the illumination ring 336 is shown as having has four exemplary segments that represent the quadrants 380, 382, 384 and 386 of the overall circumference each of which are connected to a lighting controller 370. The ring 336, as well as other light ring components described below, can be segmented into any number of individually controllable elements to provide improved lighting conditions, also as described below.

Figure 3A:
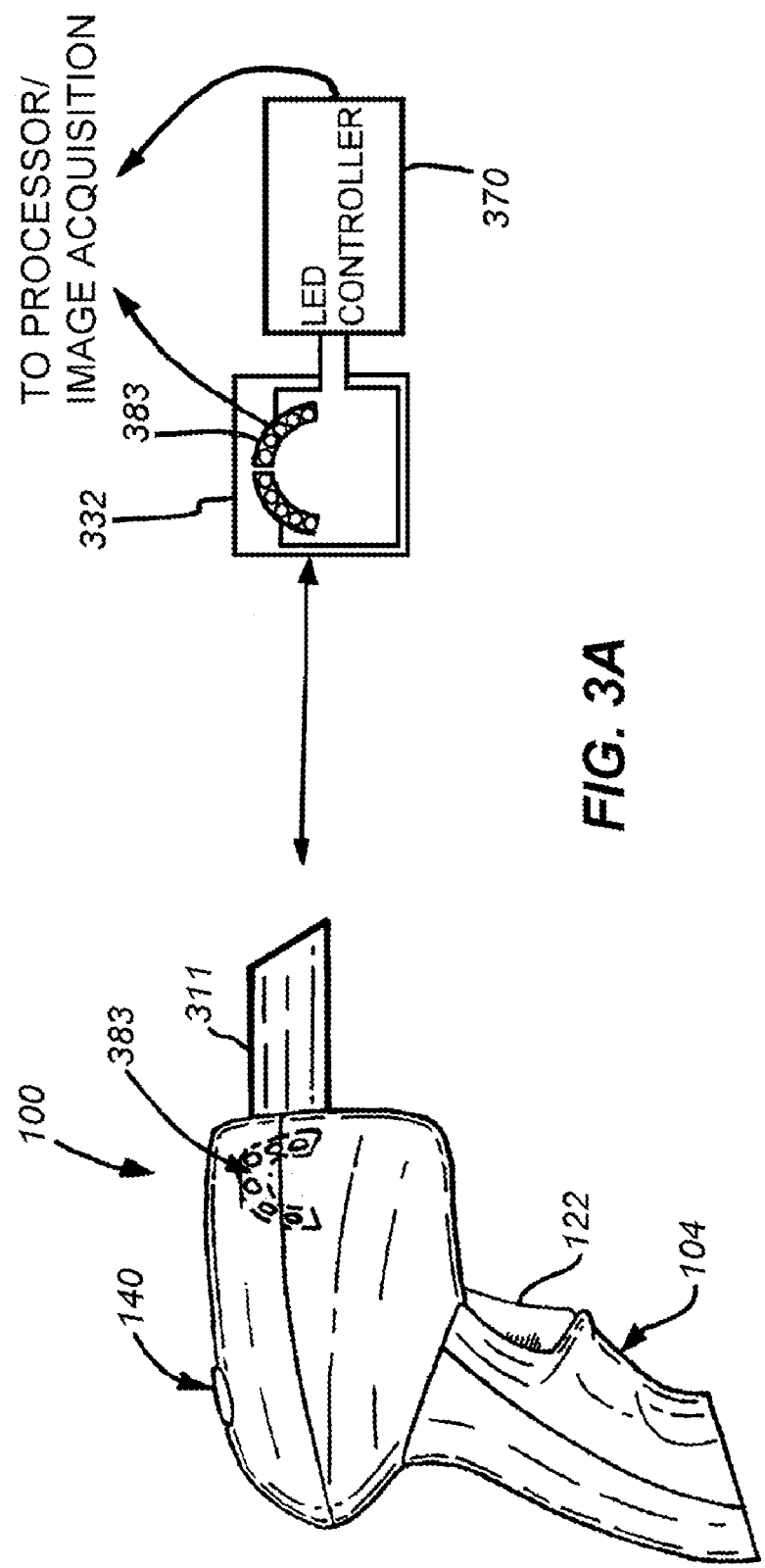
FIG. 3A is a perspective view of a handheld scanning system including a light pipe and illumination ring having an arc configuration.

Referring now to FIG. 3A, an alternative embodiment of an illuminator 100 having a light pipe 311 and an arcuate illuminator 383 which extends over only a portion of a full ring is shown. The partial ring arced light pipe 311 and arcuate illuminator 383 are particularly useful for illuminating small areas, where, for example, a full light pipe cannot be brought close enough to the symbol to be illuminated. Situations in which these types of light pipes are useful include, for example, where it is necessary to illuminate a symbol positioned on or near a corner, in a seam, or on a round or curved surface.

Referring again also to FIG. 3, as noted, each passive light pipe is constructed from a light-transmissive material. This material can be acrylic, glass, or any other material capable of acting as a wave guide for visible and near-visible light. The wall thickness of each pipe may vary. In general, thicknesses are between approximately ⅛ inch and ¼ inch. However, larger or smaller thicknesses are expressly contemplated. The overall length of the outer light pipe is also highly variable. As noted above, it is set so that the focus on the desired field of view is attained near, but beyond, the end of the tip 340. In one embodiment, the outer light pipe has a length of approximately 3-4 inches. The inner light pipe 314 can be approximately the same length as the outer light pipe, but in this embodiment, the inner light pipe is recessed with respect to the outer, as shown, so that light can exit from the inner edge of the tip 340. The tip's light-transmissive region is shown by the dashed line 342. This inner edge light outlet can be formed by exposing and/or polishing a strip in the otherwise opaque overall surface of the outer light pipe 312. This light transmissive strip or region can extend (for example) ¼ inch, more or less, as shown by thickness T. The thickness T is variable. Due to internal reflection caused by the angled portion 350 of the tip 340, low angle illumination 352 exits from the open region 342. Similarly, the open tip 360 of the inner light pipe 314 facilitates direct, bright field illumination 362 on the area of interest 320. The mechanics of the nested light pipe 310 are described in further detail below. Reference will first be made to FIG. 4, which describes, more particularly, a dark field illuminator. Reference will also be made generally to the ring illuminator 334 and controller 370 of FIG. 3. Note that, while an opaque coating of paint or another acceptable material is used, to insulate the dark field light pipe against light leakage, it is contemplated that all or a portion of the light pipe can remain uncovered, particularly where the surface is sufficiently well-polished to cause near-total internal reflection along its length.

Referring now to FIG. 4, a CMOS, CCD or other electro-optical sensor 414 is provided on a circuit board 412. A single ring illuminator of LEDs or other light sources 410 may also be provided on the board 412, or separately from the board. The electro-optical sensor and light sources 410 interconnect to a controller and/or image acquisition processor similar to those shown in FIG. 3. A dark field-illuminating light pipe 420 is shown in cross-section. This surrounds the image sensor 414 and its associated optics 422, and is aligned with the light sources 410 which are transmitted through the light pipe 420 to provide dark field illumination as described above. A transparent window 424 can be provided in front of the optics 422 to protect the circuitry. As noted above, the tip 430 of the light pipe 420 is angled at an angle A (approximately 45 degrees or more) so that light is reflected to pass through an exposed thickness T along the inner perimeter of the light pipe using internal reflection. The light transmits with the desired low-angle (or a high angle (over 45 degrees) respect to optical axis centerline CL) dark field illumination pattern 440 that, in this embodiment, is within a range DD of 0-1.25 inch. Note that the angle A of the tip (approximately 45 degrees in this example) determines the general angular range of light exiting the tip. There tends to be a spread of angles, in fact, and the prevailing angle of light may vary somewhat from the angle of the tip. The angle A of the tip may be altered to generate the best angle and spread for light based upon the material used for the light pipe and it's wall thickness.

As also shown in FIG. 4 an extended bright field range DB of 3-4 inches extends beyond the dark field range. In one embodiment, the bright field is not illuminated or can be illuminated by a variety of other external sources. To this end, in an alternate embodiment, the dark field light source may further include an external bright field illuminator 450 and/or 460. In one example, the bright field illuminator is a ring light source (with or without a light pipe) 450 that may or may not be mounted on the circuit board 412 (see board extensions shown in phantom). The radial spacing of the optional, external bright field ring is variable. It may closely abut the dark field light pipe 420, or may be spaced away from this light pipe as shown. According to another alternative, a bright field illuminator 460 may be provided at another external location or locations. Note that the term "external" as used herein should be taken broadly to include a location that is inside the lumen of the dark field light pipe, such as, for example at the base of the pipe (adjacent to the circuit board, for example). This illuminator can be provided as the only bright field illuminator, or in addition to the bright field ring 450.

With reference now to FIG. 5, a light pipe having only a bright field illuminator is shown. A circuit board, 510, carries LEDs 512 surrounding a sensor 514 with associated optics 516 and a window 518 to protect them. A light pipe 520 communicates optically with the ring illuminator LEDs 512. The tip 522 of the light pipe 520 can be rounded or flat and can include a diffusing (frosted, for example) surface texture for enhanced scatter of bright field light. Note that other bright field light pipes described herein can have similar tip constructions and surfaces. The walls (inner and outer) of the light pipe 522 can be coated with an opaque, non-transmissive material or can remain transmissive. Surrounding the outer circumference of the light pipe 520 at various points are each of a set of individual directing rods/lenses 530 (shown in partial cross-section for clarity of rod-like structure) that each optically communicate with individual or clusters of LEDs 532. Because the field of view of the sensor is limited, and the subject must remain within the field of view to be properly read, the LEDs 532 project aiming points, typically of a different, noticeable color onto the item of interest. For example the aiming LEDs can project a prominent blue, red or green dot while the overall illumination is a whitish light. Note that the aiming point rods herein are circular in cross section. However, they may be triangular, square or any other shape that adequately denotes an aiming point.

Figure 6:
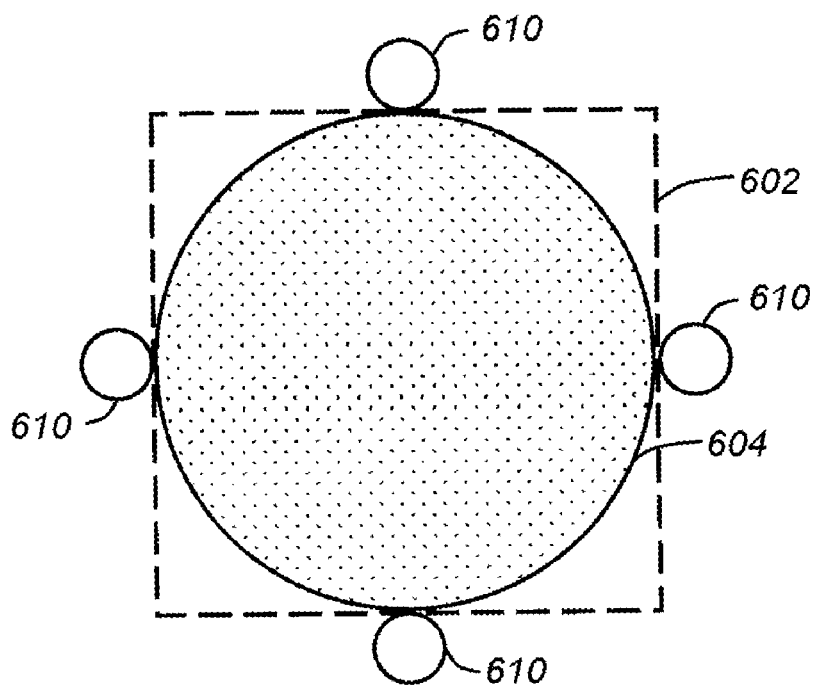
FIG. 6 is a plan view of a circular illumination pattern projected by the illuminating light pipe of FIG. 5.
Figure 7:
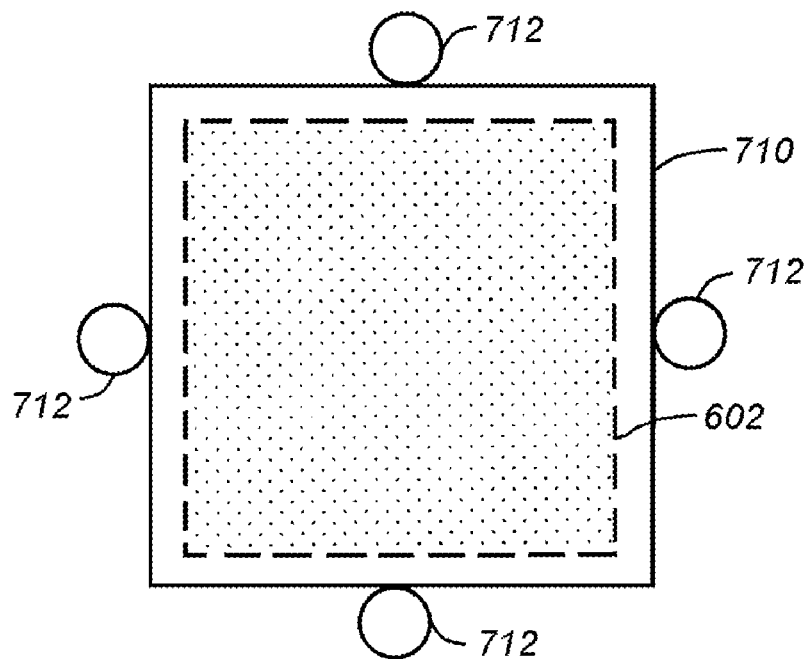
FIG. 7 is a plan view of a rectangular/square illumination pattern projected by the illuminating light pipe of FIG. 5, encompassing the sensor's full field of view.

Two exemplary illumination patterns obtained with the bright field illuminator of FIG. 5 are shown, respectively in FIGS. 6 and 7. In FIG. 6, the field of view of the camera sensor, shown as a dashed line 602, is rectangular, while the circular bright field illuminator projects a circular illumination pattern 604. This may be desirable where the subject has a circular outline and the corners of the field of view are not needed, or where the symbol/subject orientation is unknown. The scanning application and/or image acquisition circuitry can be set to reject data within these corners to speed processing. To ensure that the user aligns the illuminator properly with respect to the subject, four aiming dots 610 are provided around the perimeter of the illumination field 604. These aiming dots give instant feedback to the user so that he or she properly aims the illumination and field of view of the appliance onto the subject. Similarly, as shown in FIG. 7, where a square light pipe is employed, a square illumination pattern 710 is provided. This falls within the relative field of view 602. Again, aiming dots 712 are used to ensure proper direction of the appliance by the user. In this embodiment, the dark field illumination range DB 1 spans generally between approximately 0 and 12 inches from the tip 522 of the light pipe. Other ranges are contemplated, of course.

Figure 8:
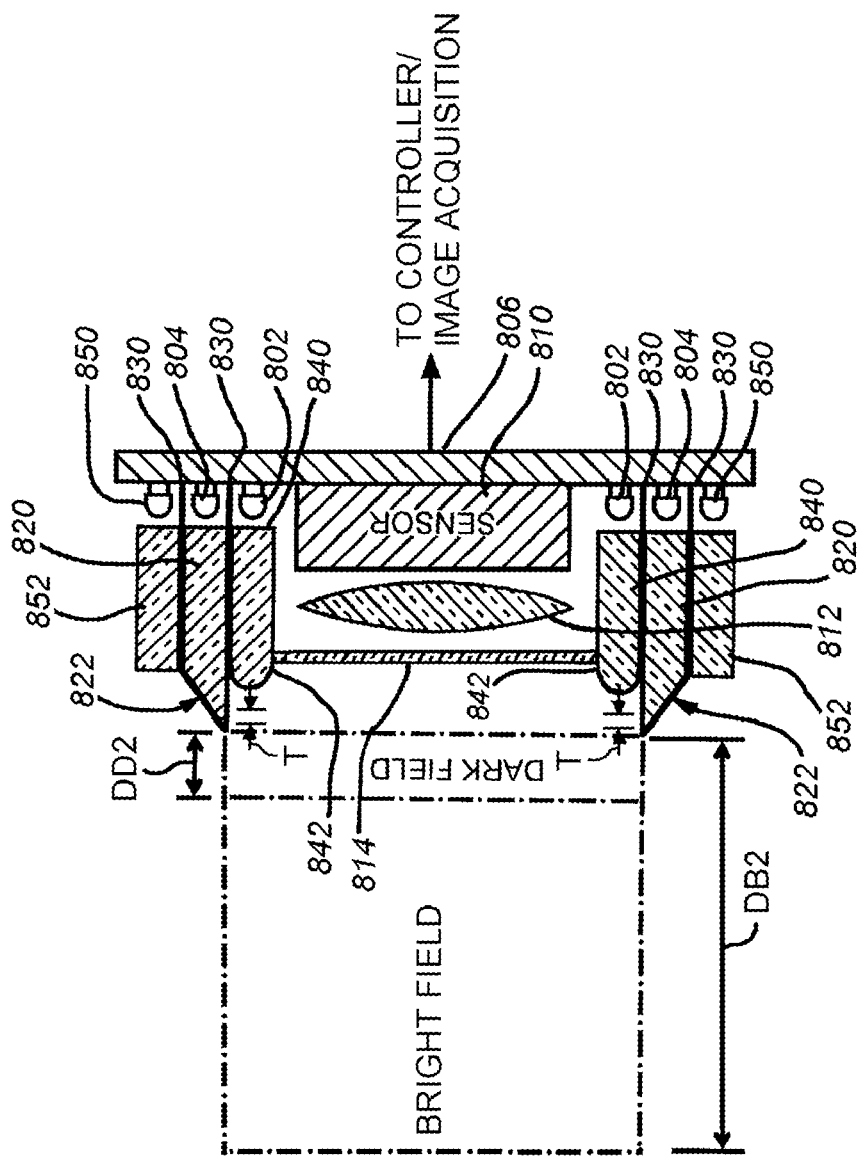
FIG. 8 is a side cross section of a sensor with bright field illuminating passive light pipe, nested within a dark field illuminating passive light pipe and aiming illuminators according to an embodiment of this invention.

FIG. 8 shows, in further detail, a nested light pipe arrangement in accordance with an illustrative embodiment of this invention. An inner ring of LEDs 802 and an outer ring of LEDs 804 are mounted on a circuit board 806 that also includes a sensor 810. Associated optics for the sensor 812 are provided within a window area 814. As noted above, the outer light pipe 820 includes a tip 822 that is angled so as to produce, through an opening, thickness T an internally reflected beam of dark field illumination with a span DD2 having a range of 0-1.25 inch in one embodiment. The walls of the light pipe 820 are coated with a non-transmissive, opaque coating and the LEDs 804 of the ring are sealed by baffles 830 that isolate this illumination source with respect to the inner LEDs 802 and associated inner bright field light pipe 840. The bright field light pipe is nested within the dark field light pipe 820 and its tips 842 are recessed so as not to interfere with the opening thickness T. The tips 842 can be rounded, angled or flat. They produce an appropriate bright field illumination pattern that, in this embodiment, can extend a distance DB2 from 0-6 inches with respect to the tip 822 of the dark field illuminator. In this manner, a bright field subject can be contacted by the appliance and still adequately illuminated. Though, for contact viewing of a subject, the inner diameter of the lumen formed by the light pipe assembly must be at least as large in diameter as the subject being viewed. Nevertheless, in certain embodiments, it is contemplated that it is smaller and that the scanning application can include mechanisms for assembling portions of an image formed as the appliance is moved around the image to take in all aspects of it when it is larger than the maximum field of view afforded to the sensor. Again, as noted above, the controller can determine either automatically or manually, whether to activate the dark field illumination ring LEDs 804 or the bright field illumination ring LEDs 802 depending upon the subject and/or image quality obtained. A set of perimeter LEDs 850 communicate with lenses 852 in the form of rods that provide aiming dots as described above.

Figure 9:
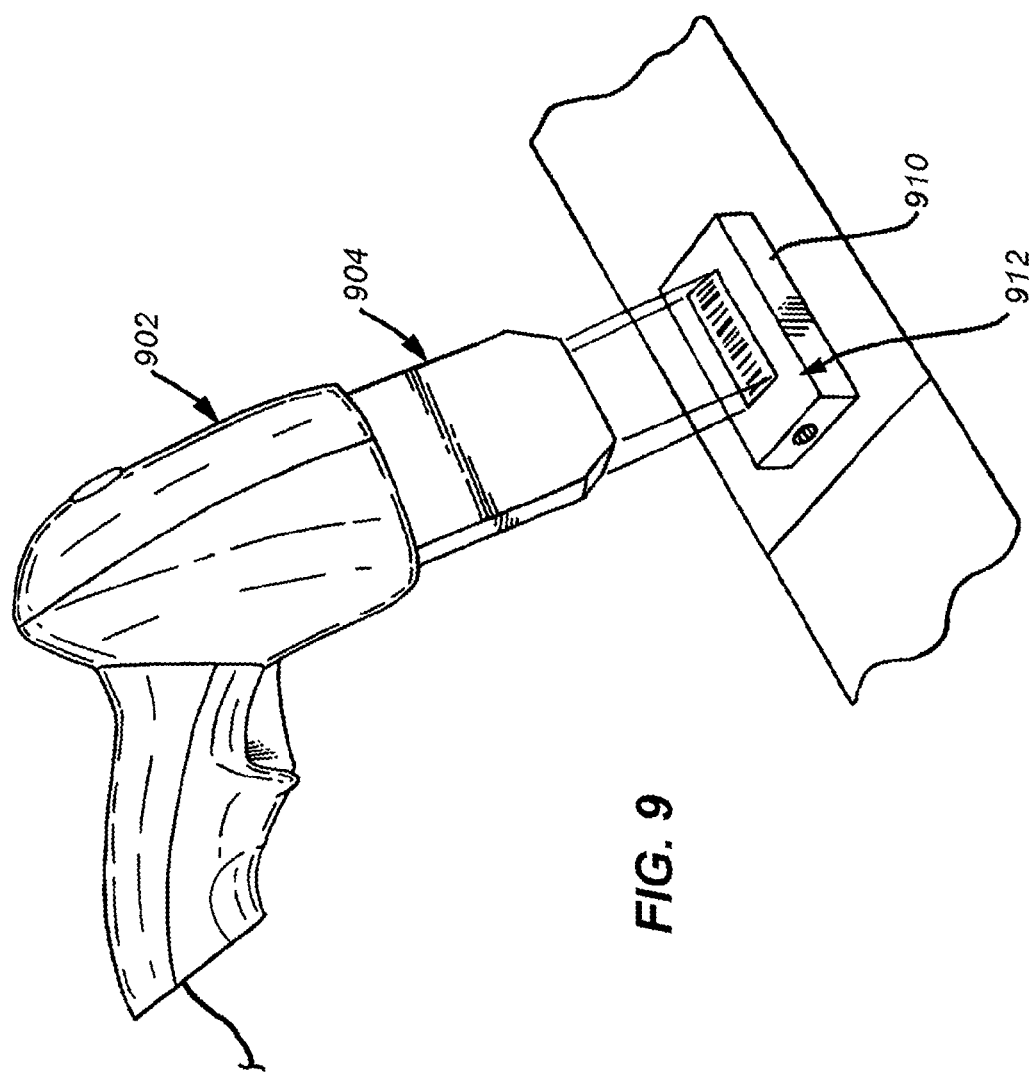
FIG. 9 is a perspective view of a handheld scanning system employing a passive light pipe that illuminates a modified or restricted sensor field of view according to an alternate embodiment.

As also described generally above, the light pipe can be used to restrict the native field of view of the sensor. FIG. 9 shows a scanning appliance 902 having a rectangular cross-section light pipe 904. This light pipe can either be a dark field or bright field (or combination) illuminator. In this example, an item 910 includes a long, narrow subject 912, namely a one-dimensional bar code. The illuminator projects a pattern similar in size and shape to the bar code itself. In this manner, when the user directs the illumination field to the item 910, he or she is naturally prompted to align the rectangular illumination pattern with the bar code. That is, the user receives immediate feedback as to the location of the reduced field of view, which appears as a bright area that generally conforms to the subject outline. The subject is better delineated by the reduced area, and any information outside this area can be omitted from the acquisition data stream, thus speeding image processing.

Figure 10:
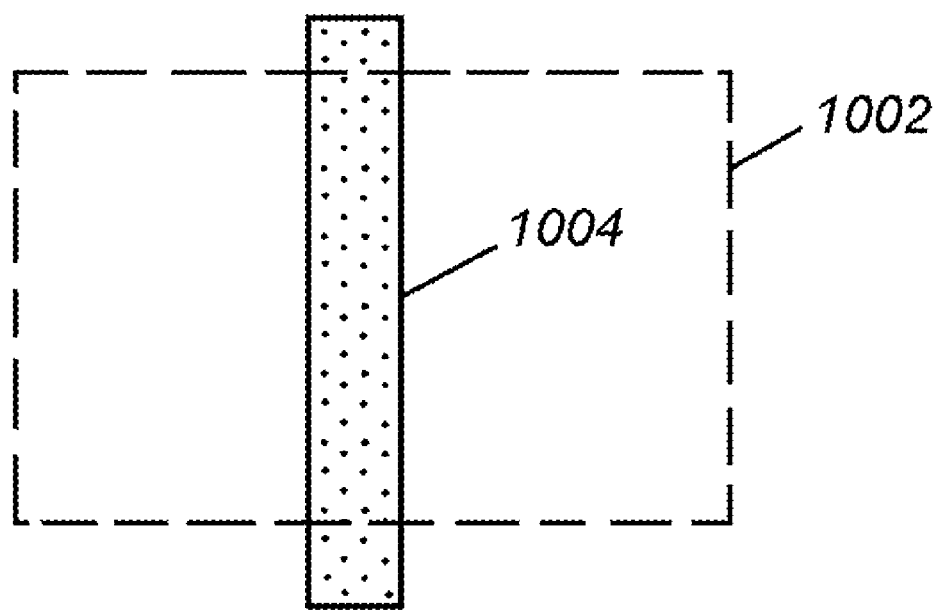
FIG. 10 is a plan view of a rectangular illumination pattern projected by the illuminating light pipe of FIG. 9, encompassing a modified/restricted sensor field of view.

With reference to FIG. 10, the overall field of view of the camera, shown as dashed line 1002, is a large square while the illumination area is a substantially narrower rectangle 1004. Again, this rectangle conforms to the shape of a one-dimensional bar code in this example. A variety of other shapes and sizes can be provided for a selective illumination area with respect to the overall field of view. Small circles, ovals, squares and complex geometric patterns are all contemplated. Appropriately shaped light pipes are constructed to conform to these shapes. Likewise, these light pipes can include dark field, bright field or a combination of bright and dark field structures as described above. Similarly, the narrowed-field of view (or "reduced field of view") illuminator can include aiming dots to further assist alignment on the subject.

Figure 11:
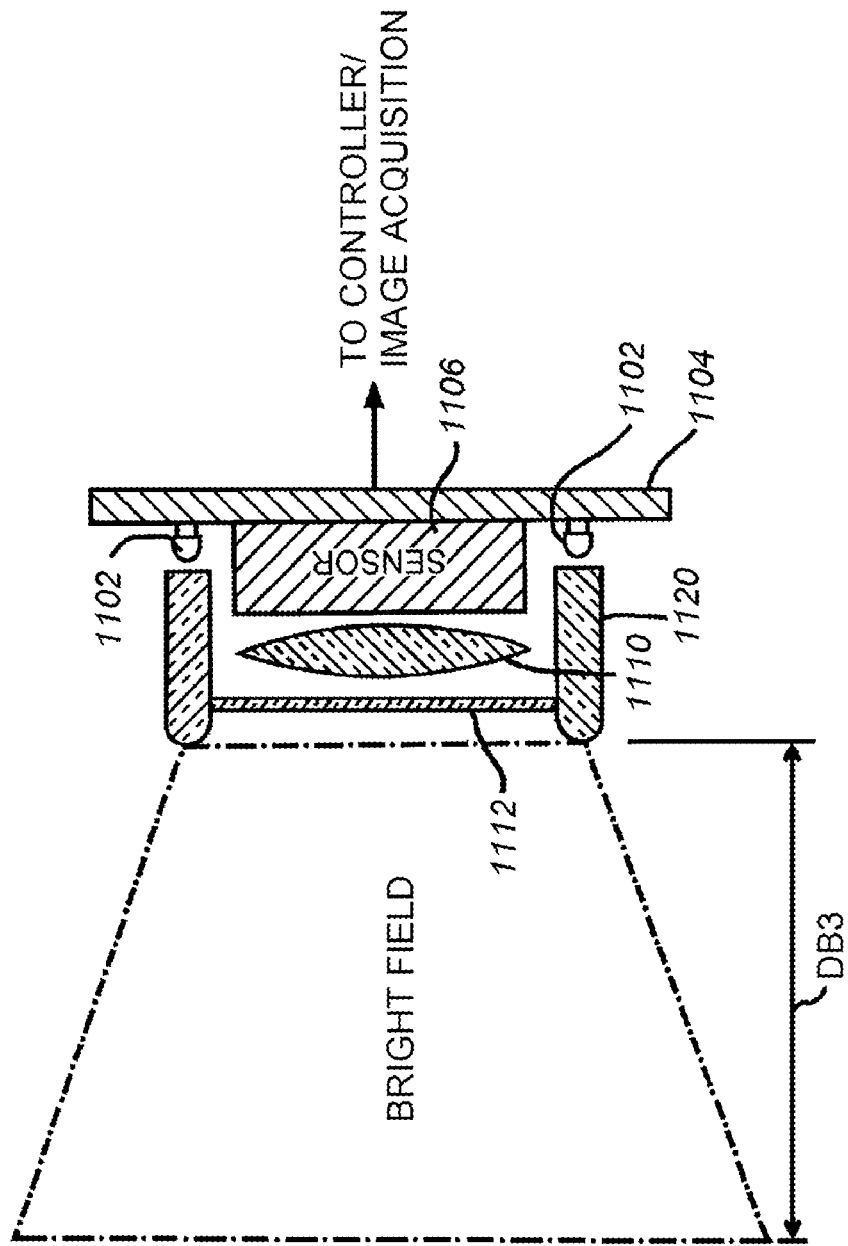
FIG. 11 is a side cross section of the sensor and passive light pipe illuminator that can be used to generate a predetermined bright field pattern such as, for example that of FIG. 9.

Referring now to FIG. 11, in the example of a bright field illuminator, a ring of LEDs 1102 is mounted on a circuit board 1104, which also includes a sensor 1106. The board is interconnected with a controller or image acquisition device that includes scanning software applications. A bright field illumination pattern extends a distance DB3 from the tip of the light pipe 1120. In this example the distance DB3 is approximately 6-8 inches. However other distances are expressly contemplated. The scanning software application is adapted to reject pixels outside of the desired field of view either through knowledge of pixel addresses that fall outside of the desired field or because these pixels are not appropriately illuminated and are therefore rejected (e.g. they are too dark). An appropriate optics 1110 and window 1112 is also provided as well as a light pipe 1120 that is shaped as an elongated rectangle.

Figure 12:
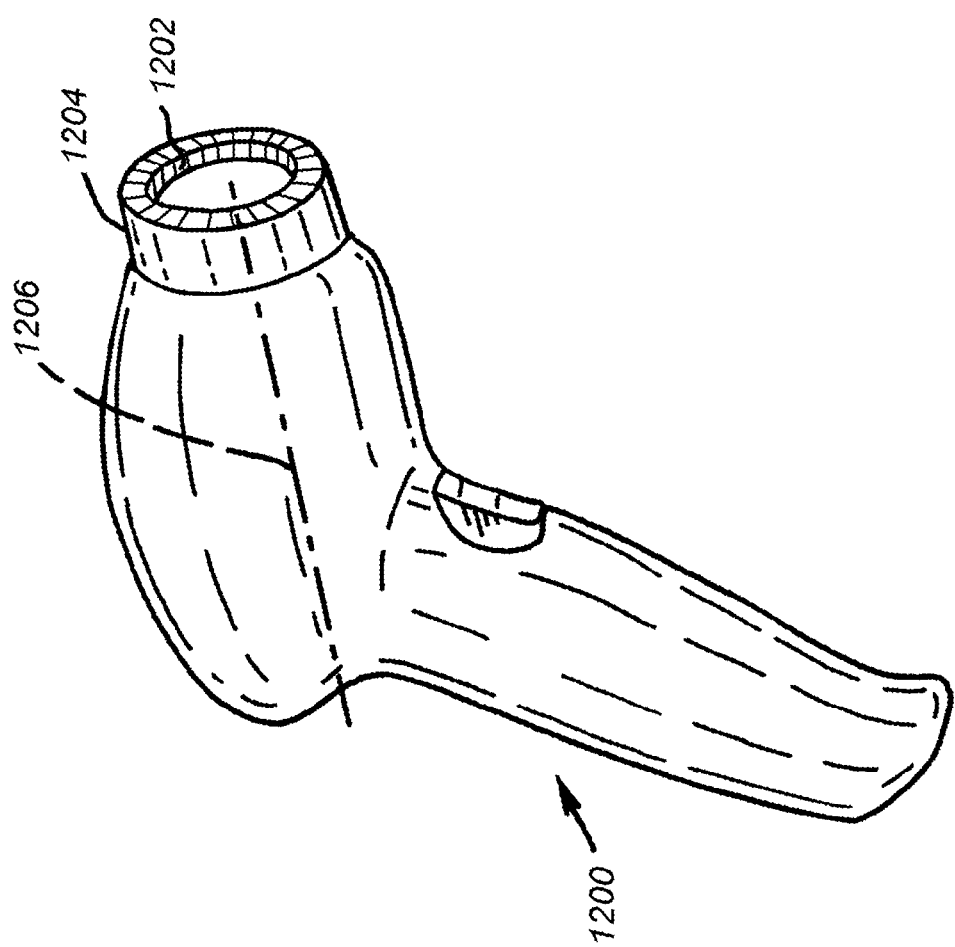
FIG. 12 is a plan view of a dark field illuminating active light pipe according to another embodiment of the invention.
Figure 13:
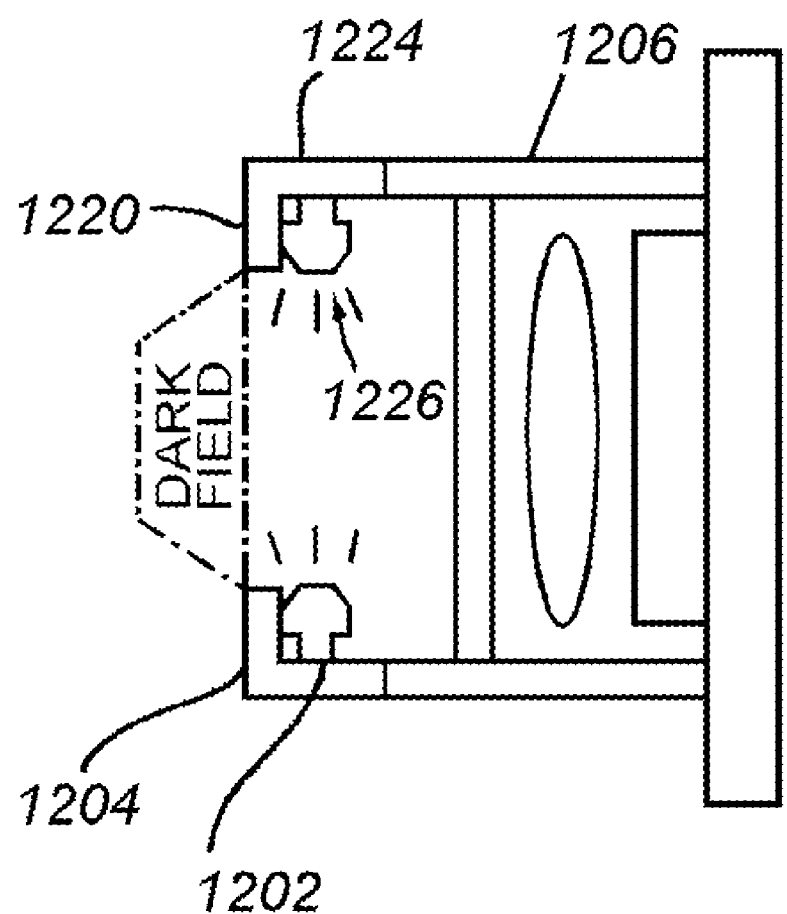
FIG. 13 is a side cross section of a sensor with the dark field illuminating active light pipe of FIG. 12.

Referring now to FIGS. 12 and 13, an alternate embodiment of a scanning system 1200 including an active dark field illumination system is shown. Here, rather than providing the illumination ring at an end of a light pipe opposite the surface to be illuminated and directing the light through the pipe, as described with reference to FIGS. 3, 4 and 8 above, an illumination ring 1202 is mounted inside of an opaque cover or receptacle 1204 at the end of a pipe 1206 adjacent the surface to be illuminated. The purpose of the pipe 1206 is to position the illumination ring 1202 near the surface to be illuminated, and the pipe 1206 therefore does not need to be constructed of a transmissive material as described above. However, transparent tube material aids in visually placing the reader over the code to be read The opaque cover 1204 is sized and dimensioned to receive the illumination ring 1202, and includes a top opaque surface 1220, and an outer opaque surface 1224. The inner surface 1226 is either left open, or includes a plurality of mounting holes for receiving individual lighting elements such as light emitting diodes (LEDs) which form the illumination ring 1202. The opaque surfaces 1220 and 1224 prevent light from the illumination ring 1202 from being transmitted directly onto an underlying illumination surface adjacent the scanning system 1200, and directs light from the illumination ring 1202 instead inward, toward the center of the light pipe 1206. As shown in FIG. 13, as the light exits the light pipe 1206, it is therefore angled, providing dark field illumination to the surface to be illuminated. As described above, bright field illumination elements could also be provided in conjunction with the active dark field illumination pipe.

As described above with reference to FIG. 3, the illumination ring 1202 of FIG. 13, as well as any of the dark field illumination rings and arcuate illuminators shown in FIGS. 3, 3A, 4, and 8, can be segmented into individually-controllable segments. These illuminators are described collectively hereafter as "illumination rings". However, the discussion below applies equally to both rings and arcuate lighting segments, as described above with reference to FIG. 3A. The individually-controllable segments can comprise four segments, such as the quadrants 380, 382, 384 and 386 shown in FIG. 3, or be segmented in a number of alternate ways. For example, in alternate embodiments, the ring illuminator may be divided into halves, or any larger number of segments can be employed, including segments comprising individual LEDs. Irrespective of the selected segmentation, the segments can be separately controlled or addressed by the controller 370 (FIG. 3) to attain a desired dark field illumination pattern, as described below. The controller 370 can further selectively activate or modulate the light emitted from any of these elements, vary the exposure time of the sensor 330, or vary the focal point of the camera, also as described below.

Figure 14:
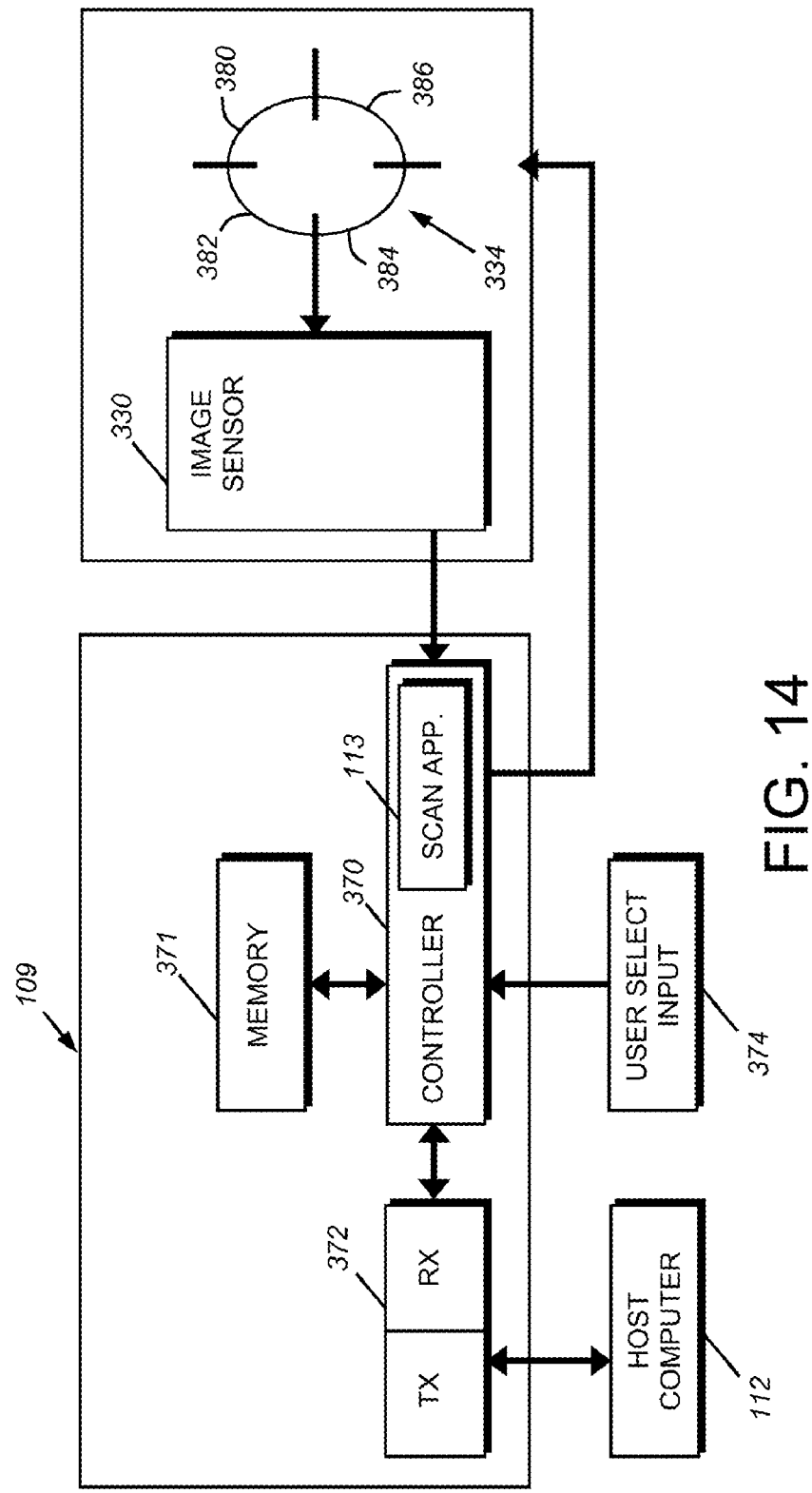
FIG. 14 is a block diagram of a control system of a scanning device including an illumination ring constructed in accordance with any of the embodiments shown.

Referring again to FIGS. 1, 2 and 3, and also to FIG. 14, a block diagram of a control system for use in controlling a ring illuminator as discussed with respect to FIGS. 3, 4, 8, and 13 is shown. As described above, the scanning device (100, 200, or 1200) includes onboard processing 109 including a scanning application 113. The processor 109 includes a controller 370, connected to the ring illuminator 382 for controlling the activation of lighting elements 380, 382, 384, and 386. The controller 370 is further connected to an image sensor 330 for acquiring image data, to a memory 371 for storing and retrieving image data, as well as lighting selection data, as described below, and to a transmitter/receiver 372 for transmitting data to and receiving data from a host computer 112. A user select input 374 can also be connected to provide data to the controller 370 to provide a manual selection of lighting conditions or other parameters as described below.

In operation, the on-board processing board 109 can be operated to assure adequate or optimized lighting conditions based upon an evaluation of feedback data for both handheld (FIGS. 1 and 12) and fixed applications (FIG. 2). To achieve such conditions, the scan lighting is controlled by the scanning application 113 and controller 370 to individually control each of the light segments, such as the quadrants 380, 382, 384, and 386, to selectively activate or deactivate the individual segments, dim or brighten selected segments, or to vary the exposure time of the lighting on the illumination surface. Re-orienting the applied lighting can be useful, for example, when illuminating metallic or curved surfaces, or when illuminating highly reflective surfaces. When illuminating metallic or similar grained surfaces, for example, it has been observed that illumination is often more effective when oriented along the grain of the material. With the ability to dim or deactivate illumination across the grain, a significantly improved image can be attained. Furthermore, when illuminating curved surfaces, improved results can be attained by illuminating the surface in a selected direction. Similarly, varying lighting conditions can be beneficial when working with reflective surfaces.

The scanning application 113 can entail, for example an initialization process in which the individually-controlled light segments 380, 382, 384, and 386 are cycled through a variety of preset on/off combinations is performed until the quality of the image is determined to be sufficient for evaluating a bar code or other symbol, or to determine which of the settings provides the best image quality. In this process, feedback in the form of image data acquired by the sensor 330 is evaluated by the controller 370. For example, the image data acquired by the sensor 330 can be processed for each different available setting of the individual quadrants 380, 382, 384, and 386, and when an acceptable and/or optimal image is attained, that particular setting can be selected for on-going data acquisition. Image optimization can be based upon recognition of known fiducials or detection of maximum contrast over a sufficiently wide portion of the viewed area of interest.

In a fixed-camera arrangement, this adjustment process can typically be carried out once, and the selected setting can be applied to each successive acquired image. Alternatively, in handheld scanning applications, where angles and orientations of the appliance relative to the item are likely to change, the adjustments can also be made dynamically for each scan, or selectively performed by the operator who selects the initialization mode, for example, when environmental conditions change. Even in handheld operations, however, a fixed setting can be effective where the scan will always be taken from approximately the same location, and/or in the same environmental conditions, or in a known subset of available conditions.

In embodiments which include both bright and dark field illumination, as shown, for example, in FIGS. 3, 4, and 8, the scan application 113 can also be programmed to select between dark field or bright field illumination depending on which type of illumination best suits a particular application. The selection between bright and dark field illumination can be made automatically by the image processor based feedback, as described above, or selected manually by the operator.

Figure 15:
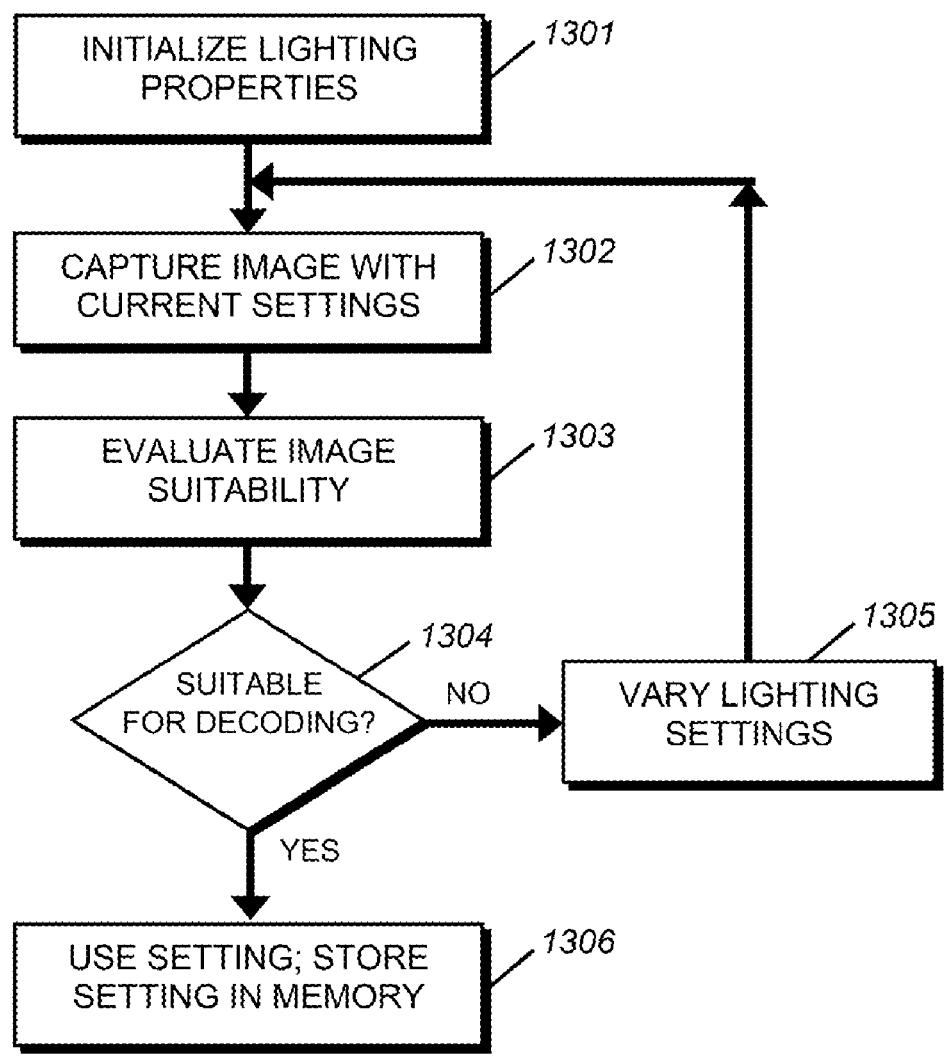
FIG. 15 is a flow chart of illustrating steps for selecting lighting parameters by the control system of FIG. 14.

Referring again to FIGS. 1, 2, 3, 13 and particularly to FIG. 15, a flow chart illustrating a typical process for selecting lighting conditions is shown. As described above, the scanning system 100 can be initialized using a predetermined initial lighting configuration 1301, which can be, for example, a series of predetermined lighting variations, or, alternatively, a pre-selected general purpose setting, or a "cached" setting retrieved from the memory component 371. The stored setting can be, for example, the setting from the last successful or a previous successful decode attempt, a setting which has been determined statistically to be typically successful in the environment, or an average setting determined over a series of successful attempts. The initial setting can activate or deactivate various individually-controlled light segments such as the quadrants 380, 382, 384, and 386 of an illumination ring, activate or deactivate dark or bright field lighting, or modulate the brightness levels of any of these lighting elements by varying an analog signal applied to the light segments, applying a pulse-width modulated signal, or in various other ways which will be apparent to those of skill in the art. The exposure time of the sensor 330, and the focal length of the camera can also be varied to obtain optimal conditions.

After the symbol is illuminated, an image data set is acquired by the sensor 330 in step 1302, and this data set is evaluated in step 1303. Evaluation of the image data in step 1303 can comprise an attempt to decode the symbol, or, in the alternative, comprise a statistical evaluation of the acquired data set based on histograms or other statistical analyses known in the art to determine whether the contrast between white and black pixels in the acquired data is within an expected range. If the data set acquired in step 1302 is determined to be suitable for decoding, a "good read" has been established and, in step 1306, the symbol is decoded and the process is stopped. The settings established in step 1301 can also be stored or cached in the memory component 371 for later retrieval, as described above.

Data suitable for decoding can be based on a full read of the symbol, or on a partial read, in which data is reconstructed using error-correcting methods such as parity checks, check sums, and known symbol criteria such as the number of characters expected, or other parameters which will be apparent to those of skill in the art.

If the image data set is not suitable for decoding, in step 1304, the controller 370 changes the lighting settings by varying the selection of bright or dark field illumination, varying the set of individually-controllable light elements which are activated or deactivated, or by modifying the brightness of the light provided. These parameters can be determined, as described above, based on a pre-established set of parameters, by an analysis of the acquired data set, or by user selection. After new settings are selected in step 1305, a new image data set is acquired in step 1302, and steps 1303-1305 are repeated until a "good" data set is acquired, and the symbol is decoded.

Although the variation of lighting has been described above as an automatically-controlled process, as shown in FIG. 14, the controller 370 can also receive manual commands from the user through a user select input 374. The user select input can receive, for example, an input signal from a single or multi-position switch provided on the scanning device, an input provided through other software or hardware-based user interfaces provided on the scanning device, or through software on a computer 112 connected to the controller through the transmitter/receiver 372. Various other ways for providing an interface for users to select lighting parameters will be apparent to those of skill in the art. Through the user select input 374, the user can manually choose, for example, to activate individual quadrants or segments in the illumination ring, select a predetermined sequence of segments, vary the brightness of the illumination, select between bright and dark field illumination, or re-start an initialization process which provides a predetermined set of variable illuminations, as described above. Other manual selections, as will be apparent to those of skill in the art, could be provided through a user input.

The foregoing has been a detailed description of illustrative embodiments of this invention. Various modifications and additions can be made without departing from the spirit and scope thereof For example, although a block diagram comprising a specific configuration for the control system is shown, it will be apparent to those of skill in the art that this is a simplified representation and that various methods of constructing the hardware can be used. Additionally, it is expressly contemplated that any of the features described in any of the above embodiments can be combined with other features to produce various light pipe arrangements. Likewise, a wide variety of data processing devices, scanning application programs and/or hardware systems can be incorporated to control illumination and acquire images. Finally, the light pipes described herein can be provided with integral illuminators on a circuit board that also includes a sensor and control functions that allow the sensor to communicate with the illuminator. Alternatively, the illuminator, light pipe and camera can all be separate components that are interconnected via one or more controllers, or all connected to a common computer or processor through appropriate interfaces. Various combinations of sensor, optics, illuminator and light pipes are all expressly contemplated. For example, sensors may be provided on the same circuit board as the processor and the light sources, or any/all of these components. can be separate. Appropriate interfaces and attachment mechanisms, that should be clear to those of ordinary skill, can be provided to facilitate interaction between the various components described herein. In addition, while the bright field light pipe is described as nested within the dark field light pipe, it is expressly contemplated that these two pipes can be reversed by positioning the bright field illuminator outside the dark field light pipe. Likewise, either light pipe (or light source therefor) may be defined as a broken ring, with non-illuminated segments along their perimeters. Accordingly, this description is meant to be taken only by way of example and not to otherwise limit the scope of the invention.

What is claimed is:

1. A method for decoding an encoded data symbol, the method comprising:
   providing a light source comprising a plurality of individually-controllable lighting elements for providing low angle dark field illumination;
   activating an image sensor for detecting image data reflected from an encoded data symbol when the encoded data symbol is illuminated by the light source; and
   providing a controller connected to each of the individually-controllable lighting elements, the controller being programmed for:
      selectively activating the individually-controllable lighting elements to vary the direction of the low angle dark field illumination provided by the light source;
      evaluating the detected image data and determining whether the detected image data is sufficient to decode the encoded data symbol;
      varying the low angle dark field illumination provided by the light source until the detected image data is sufficient to decode the encoded data symbol; and
      processing the image data detected by the image sensor.

2. The method according to claim 1, wherein the individually controllable lighting elements comprise portions of at least one of a circular ring, an oval ring, a rectangular ring, and an elliptical ring.

3. The method according to claim 1, wherein the individually-controllable lighting elements comprise a plurality of electrically-connected individual light elements.

4. The method according to claim 1, further including the controller evaluating the image data detected by the image sensor and varying the dark field illumination to optimize symbol decoding.

5. The method according to claim 1, wherein the dark field light source comprises a passive light pipe or an active light pipe.

6. The method according to claim 1, further including providing a manual control connected to the controller for manually selecting at least one of the individually-controllable lighting elements to be activated.

7. The method according to claim 1, further including providing a memory component for storing data corresponding to the individually-controllable lighting elements.

8. The method according to claim 1, further including the controller varying an exposure time of the image sensor.

9. The method according to claim 1, further including the controller determining whether the image data detected is sufficient to decode the encoded data symbol based on a statistical analysis of the image data detected.

10. The method according to claim 1, further including the controller determining whether the image data detected is sufficient to decode the encoded data symbol based on an attempt to decode the encoded data symbol.

11. The method according to claim 1, wherein the image sensor is connected to the controller for detecting light reflected from the encoded data symbol and for providing feedback to the controller for varying lighting conditions.

12. The method according to claim 1, wherein the dark field light source is arcuate.

13. The method of claim 1, further including providing a bright field light source for providing bright field illumination; wherein the controller is connected to the bright field illumination source and programmed for selectively activating the bright field light source.

14. The method according to claim 13, further including providing a handheld enclosure for housing the dark field light source, the bright field light source, and the image sensor.

15. The method according to claim 13, further including providing a fixed mount enclosure for housing the dark field light source, the bright field light source, and the image sensor.

16. A method for decoding an encoded data symbol, the method comprising the steps of:
   (a) providing a plurality of individually-controllable lighting elements arranged around the encoded data symbol to provide low-angle dark field illumination;
   (b) providing a bright field illuminator directed at the encoded data symbol to provide bright field illumination;
   (c) selectively illuminating the encoded data symbol with at least one of the individually-controllable lighting elements;
   (d) acquiring an image data set;
   (e) evaluating the image data set for determining suitability for decoding;
   (f) selectively varying a lighting parameter for varying the light emitted from the individually-controllable lighting elements to vary the direction of the low-angle dark field illumination on the encoded data symbol and selectively activating the bright field illuminator; and
   (g) repeating steps (d), (e) and (f) until the image data set is suitable for decoding.

17. The method according to claim 16, further including the step of arranging the individually controllable lighting elements in quadrants.

18. The method according to claim 17, wherein wherein successive occurrences of step (c) further includes sequentially activating at least one combination of the quadrants.

19. The method according to claim 16, further including the step of storing the lighting parameter found to be suitable for decoding the image data set.

20. The method according to claim 16, wherein step (c) further includes retrieving a stored illumination setting.

21. The method according to claim 16, wherein step (a) further includes retrieving default parameters for activating each of the lighting elements.

22. The method according to claim 16, wherein step (e) further includes evaluating the image date set for decoding the encoded data symbol.

23. The method according to claim 16, wherein step (e) further includes evaluating the image data set for evaluating a relative concentration of light and dark pixels.

24. The method according to claim 16, wherein step (f) further includes selectively varying the light emitted by modulating a signal applied to at least one of the individually-controllable lighting elements to vary a brightness of the illumination.

25. The method according to claim 16, wherein step (f) further includes selectively varying an exposure time for illuminating the encoded data symbol.

26. The method according to claim 16, wherein step (f) further includes selectively varying a focus parameter.

27. The method according to claim 16, wherein step (f) further includes selectively activating at least one of the individually-controllable lighting elements.

28. The method according to claim 16, wherein step (a) further includes angling the light emitted from the individually-controllable lighting elements to provide the low angle dark field illumination.

29. A method comprising:
using a ring light source, projecting low angle dark field illumination to an adjacent surface including a symbol to be decoded;
providing a controller connected to the ring light source and using the controller for selectively varying the direction of the low angle dark field illumination provided from the ring light source;
using an image sensor connected to the controller, the image sensor acquiring image data of the symbol, wherein the controller is programmed for:
evaluating the acquired image data and determining whether the image data is sufficient to decode the symbol; and
varying the light projected from the ring light source until the image data is sufficient to decode the symbol.

30. The method according to claim 29, further comprising using a bright field light source, projecting bright field illumination to the adjacent surface, wherein the controller is further programmed for selectively activating the bright field light source to illuminate the symbol.

* * * * *